US010558427B2

(12) United States Patent
Jo et al.

(10) Patent No.: US 10,558,427 B2
(45) Date of Patent: Feb. 11, 2020

(54) ELECTRONIC DEVICE FOR REPRODUCING AUDIO SIGNAL VIA EXTERNAL DEVICE AND OPERATING METHOD THEREOF

(71) Applicant: Samsung Electronics Co., Ltd., Gyeonggi-do (KR)

(72) Inventors: Jae-Hyun Jo, Gyeonggi-do (KR); Hyeonggeun Kim, Gyeonggi-do (KR); Sang-Hyeok Sim, Gyeonggi-do (KR); Byoung-Chul Lee, Gyeonggi-do (KR); Donghyoun Son, Gyeonggi-do (KR); Donghoon Hyun, Gyeonggi-do (KR); Ilsung Hong, Seoul (KR); Seung-Nyun Kim, Incheon (KR); Yong Sang Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/050,732

(22) Filed: Jul. 31, 2018

(65) Prior Publication Data
US 2019/0034161 A1 Jan. 31, 2019

(30) Foreign Application Priority Data
Jul. 31, 2017 (KR) .......................... 10-2017-0097030

(51) Int. Cl.
*G08C 17/02* (2006.01)
*H04W 88/06* (2009.01)
(Continued)

(52) U.S. Cl.
CPC ............ *G06F 3/167* (2013.01); *G06F 1/1605* (2013.01); *G06F 1/1698* (2013.01); *G06F 3/04842* (2013.01); *G08C 17/02* (2013.01)

(58) Field of Classification Search
None
See application file for complete search history.

(56) References Cited

U.S. PATENT DOCUMENTS

| 8,483,139 B2 * | 7/2013 | Gonikberg | ............ H04W 8/005 370/328 |
| 9,658,818 B2 * | 5/2017 | Pelland | ................... G06F 3/162 |

(Continued)

*Primary Examiner* — K. Wong
(74) *Attorney, Agent, or Firm* — The Farrell Law Firm, P.C.

(57) ABSTRACT

An electronic device is provided. The electronic device includes a communication circuit configured to support communications by a first communication scheme and a second communication scheme; and a processor, wherein the processor is configured to establish a first communication channel corresponding to the first communication scheme with a first external electronic device using the communication circuit; receive, from the first external electronic device, configuration information related to the first communication channel; transmit, to the first external electronic device, audio data through the first communication channel such that the first external electronic device outputs the audio data using the first communication channel; and transmit, to the second external electronic device, the configuration information related to the first communication channel through the second communication channel corresponding to the second communication scheme such that the second external electronic device is capable of acquiring the audio data using the configuration information.

20 Claims, 16 Drawing Sheets

(51) Int. Cl.
*G06F 3/16* (2006.01)
*G06F 3/0484* (2013.01)
*G06F 1/16* (2006.01)

(56) References Cited

U.S. PATENT DOCUMENTS

| | | | |
|---|---|---|---|
| 9,712,266 B2 * | 7/2017 | Linde | ...................... H04W 4/80 |
| 9,837,093 B2 * | 12/2017 | Filippini | ................ G10L 19/167 |
| 2014/0329468 A1 | 11/2014 | Watson et al. | |
| 2015/0304770 A1 | 10/2015 | Watson et al. | |

* cited by examiner

ELECTRONIC DEVICE FOR REPRODUCING AUDIO SIGNAL VIA EXTERNAL DEVICE AND OPERATING METHOD THEREOF

CROSS-REFERENCE TO RELATED APPLICATION(S)

This application is based on and claims priority under 35 U.S.C. § 119 to Korean Patent Application No. 10-2017-0097030, filed on Jul. 31, 2017, in the Korean Intellectual Property Office, the disclosure of which is incorporated herein by reference in its entirety.

BACKGROUND

1. Field

The present disclosure relates generally to a method and a device for reproducing audio signals, which are reproduced in an electronic device, through external devices, and more particularly, to an electronic device and a method for, while an electronic device outputs an audio signal through a wirelessly connected first external electronic device, outputting the same audio signal through a second external electronic device.

2. Description of Related Art

The development of digital technology has led to a proliferation of electronic devices, such as a mobile communication terminal, a personal digital assistant (PDA), an electronic organizer, a smart phone, a tablet personal computer (PC), and wearable devices, which are able to perform communication or data processing while being mobile. These electronic devices can communicate with external electronic devices by means of wireless communication as well as wired communication. Electronic devices can output signals through external electronic devices using the communication. For example, an electronic device containing audio sources can output music through external electronic devices.

When outputting audio signals through an external electronic device connected by wireless communication, the electronic device may output audio signals through a single external electronic device (e.g., a speaker) or a pair of external electronic devices (e.g., earbuds).

SUMMARY

According to an aspect of the present disclosure, an electronic device and a method are provided for outputting audio signals reproduced in an electronic device through one or more external electronic devices.

According to another aspect of the present disclosure, an electronic device and a method are provided for, while the electronic device outputs an audio signal through a wirelessly connected first external electronic device, outputting the same audio signal through a second external electronic device.

According to another aspect of the present disclosure, an electronic device and a method are provided for performing control so as to enable sniffing of an audio signal by a second external electronic device while the electronic device outputs an audio signal through a connected first external electronic device.

Another aspect of the present disclosure provides an electronic device and a method that can output audio sources included in an electronic device through a plurality of external electronic devices.

Another aspect of the present disclosure provides an electronic device and a method that allows a second external electronic device to sniff an audio signal while the audio signal is output through a wirelessly connected first external electronic device, thereby enabling output of the same audio signal through a plurality of external electronic devices.

According to an aspect of the present disclosure, an electronic device is provided. The electronic device includes a communication circuit configured to support communications by a first communication scheme and a second communication scheme; and a processor, wherein the processor is configured to establish a first communication channel corresponding to the first communication scheme with the first external electronic device using the communication circuit; receive, from the first external electronic device, configuration information related to the first communication channel; transmit, to the first external electronic device, audio data through the first communication channel such that the first external electronic device outputs the audio data using the first communication channel; and transmit, to the second external electronic device, the configuration information related to the first communication channel through the second communication channel corresponding to the second communication scheme such that the second external electronic device is capable of acquiring the audio data using the configuration information.

According to another aspect of the present disclosure, a method of an electronic device is provided. The method includes establishing a first communication channel corresponding to a first communication scheme with the first external electronic device; receiving, from the first external electronic device, configuration information related to the first communication channel; transmitting, to the first external electronic device, audio data through the first communication channel such that the first external electronic device outputs the audio data using the first communication channel; and transmitting, to a second external electronic device, the configuration information related to the first communication channel through a second communication channel corresponding to a second communication scheme such that the second external electronic device is capable of acquiring the audio data using the configuration information.

According to another aspect of the present disclosure, an electronic device for outputting audio data is provided. The electronic device includes an output device; a communication circuit configured to support communications by a first communication scheme and a second communication scheme; and a processor, wherein the processor is configured to establish a first communication channel corresponding to the first communication scheme with an external electronic device including the audio data; establish a second communication channel corresponding to the second communication scheme with the external electronic device; transmit, to the external electronic device, configuration information related to the first communication channel through the second communication channel; and output, by the output device, the audio data using the audio data received from the external electronic device through the first communication channel.

BRIEF DESCRIPTION OF THE DRAWINGS

The above and other aspects, features, and advantages, of the present disclosure will be more apparent from the following description, taken in conjunction with the accompanying drawings, in which.

DETAILED DESCRIPTION

The present disclosure is not intended to be limited to the above mentioned aspects, and other aspects which are not disclosed in the present disclosure may be understood, through the following descriptions, by those skilled in the art of the present disclosure.

Figure 1:
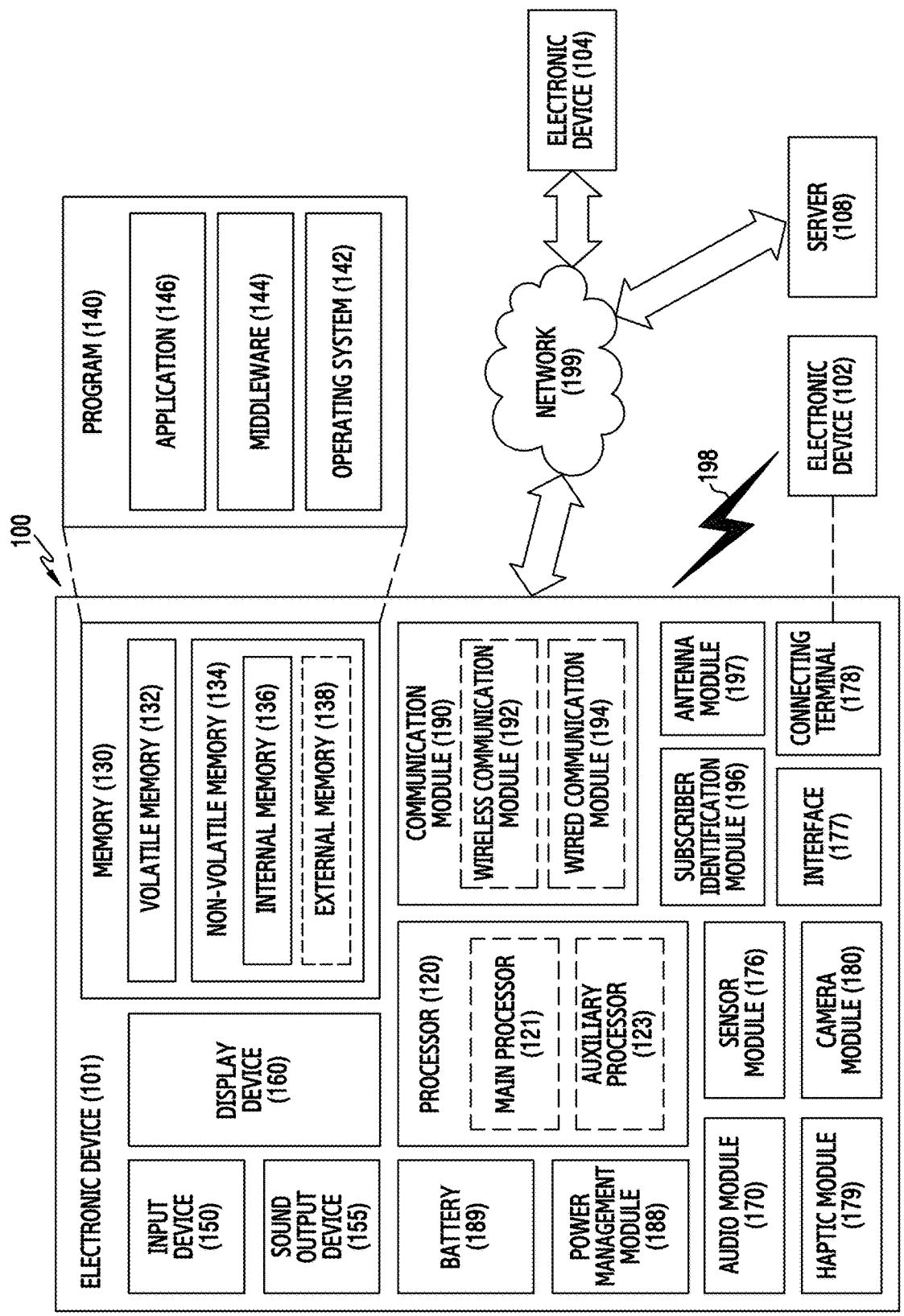
FIG. 1 is a block diagram of an electronic device for reproducing an audio signal through an external device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. Some components may be implemented as single integrated circuits. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) into volatile memory 132, process the command or the data stored in the volatile memory 132, and store resulting data into non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or be tailored to a certain function. The auxiliary processor 123 may be implemented separate from, or as a part of the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an IMS or a CP) may be implemented as a part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented separate from, or as a part of the speaker.

The display device 160 may visually provide information to the outside (e.g., a user) of the electronic device 101. The display device 160 may include, for example, a display, a hologram device, a projector, and control circuitry to control a corresponding one of the display, the hologram device, and the projector. According to an embodiment, the display device 160 may include touch circuitry adapted to detect a touch, or sensor circuitry (e.g., a pressure sensor) adapted to measure the intensity of a force caused by the touch.

The audio module 170 may convert a sound into an electrical signal and vice versa. According to an embodiment, the audio module 170 may obtain a sound via the input device 150, or output a sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more protocols to be used for the electronic device 101 to be coupled with the external electronic device 102 directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. According to an embodiment, the connecting terminal 178 may include, for example, an HDMI connector, a USB connector, an SD card connector, or an audio connector (e.g., a headphone connector), The haptic module 179 may convert an electrical signal into a mechanical stimulus (e.g., a vibration or a movement) or an electrical stimulus which may be recognized by a user via the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, IMSs, or flashes.

The power management module 188 may manage power supplied to the electronic device 101. According to one embodiment, the power management module 188 may be implemented as at least a part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with an external electronic device via the first network 198 (e.g., a short-range communication network, such as Bluetooth™, wireless-fidelity (Wi-Fi) direct, or Infrared Data Association (IrDA) standard) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be mutually coupled and may communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of the operations to be executed by the electronic device 101 may be executed by one or more of the external electronic device 102, the electronic 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing the function or service to the electronic device 101. The electronic device 101 may provide the outcome, with or without further processing the outcome, as at least part of a reply to the request. In this case, a cloud computing, distributed computing, or client-server computing technology may be used, for example.

Figure 2:
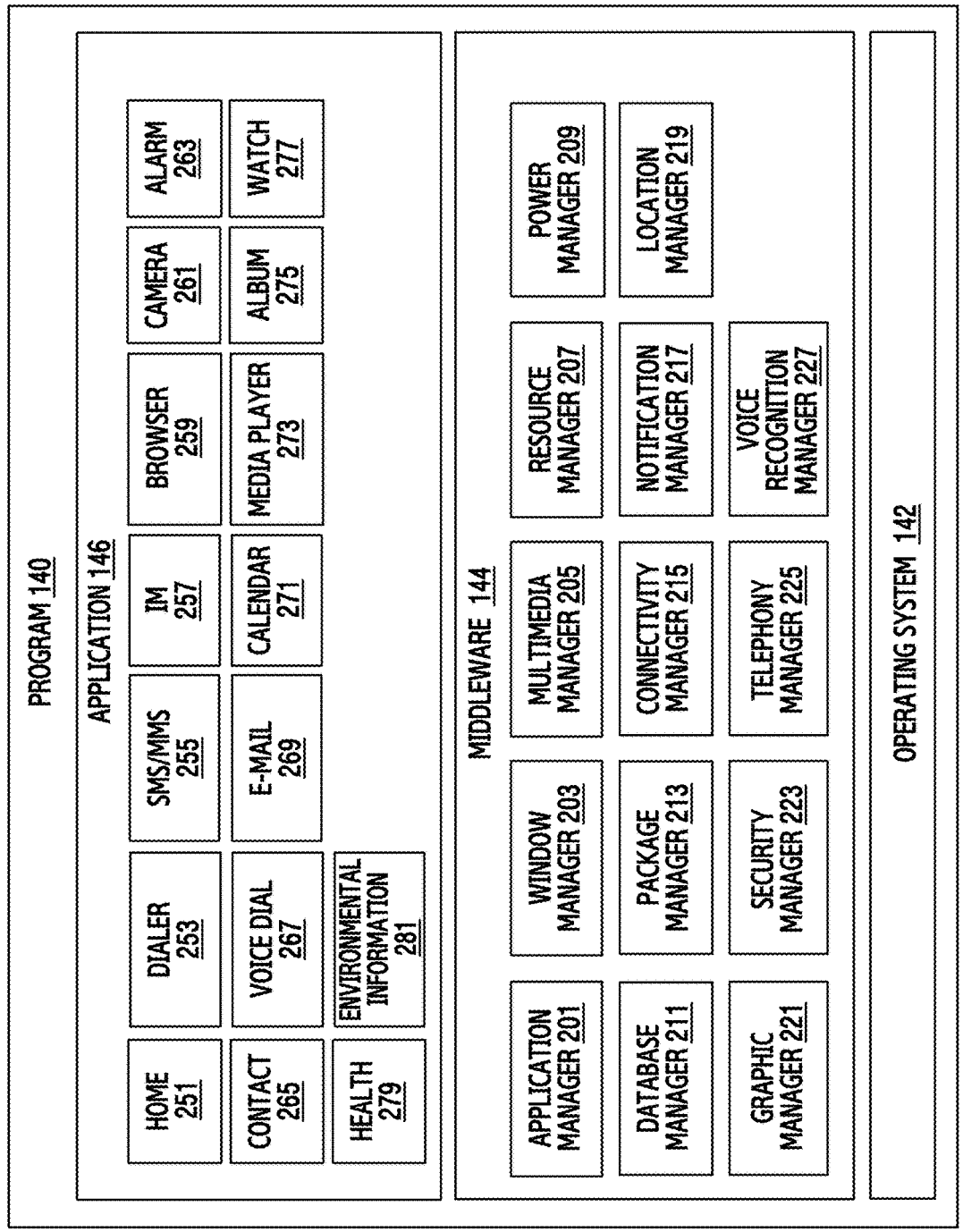
FIG. 2 is a block diagram of a program for reproducing an audio signal through an external device according to an embodiment.

FIG. 2 is a block diagram 200 of the program 140 according to an embodiment of the present disclosure.

Referring to FIG. 2, the program 140 may include the OS 142 to control one or more resources of the electronic device 101, the middleware 144, or the application 146 executable in the OS 142. The OS 142 may include, for example, Android®, iOS®, Windows®, Symbian®, Tizen®, or Bada™. At least part of the program 140, for example, may be pre-loaded on the electronic device 101 during manufacture, or may be downloaded from or updated by the electronic device 102, the electronic device 104, or the server 108 during use by a user.

The OS 142 may control management (e.g., allocating or deallocation) of one or more system resources (e.g., a process, memory, or a power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interoperate with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a certain event (e.g., an incoming call, a message, or an alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home application 251, a dialer application 253, a short message service (SMS)/multimedia messaging service (MMS) application 255, an instant message (IM) application 257, a browser application 259, a camera application 261, an alarm application 263, a contact application 265, a voice recognition application 267, an email application 269, a calendar application 271, a media player application 273, an album application 275, a watch application 277, a health application 279 (e.g., an application for measuring the degree of workout or biometric information, such as blood sugar level), or an environmental information application 281 (e.g., an application for measuring air pressure, humidity, or temperature information). According to an embodiment, the application 146 may further include an information exchanging application that is capable of supporting information exchange between the electronic device 101 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a certain event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, deletion, or updating of an application running on the external electronic device.

Figure 3:
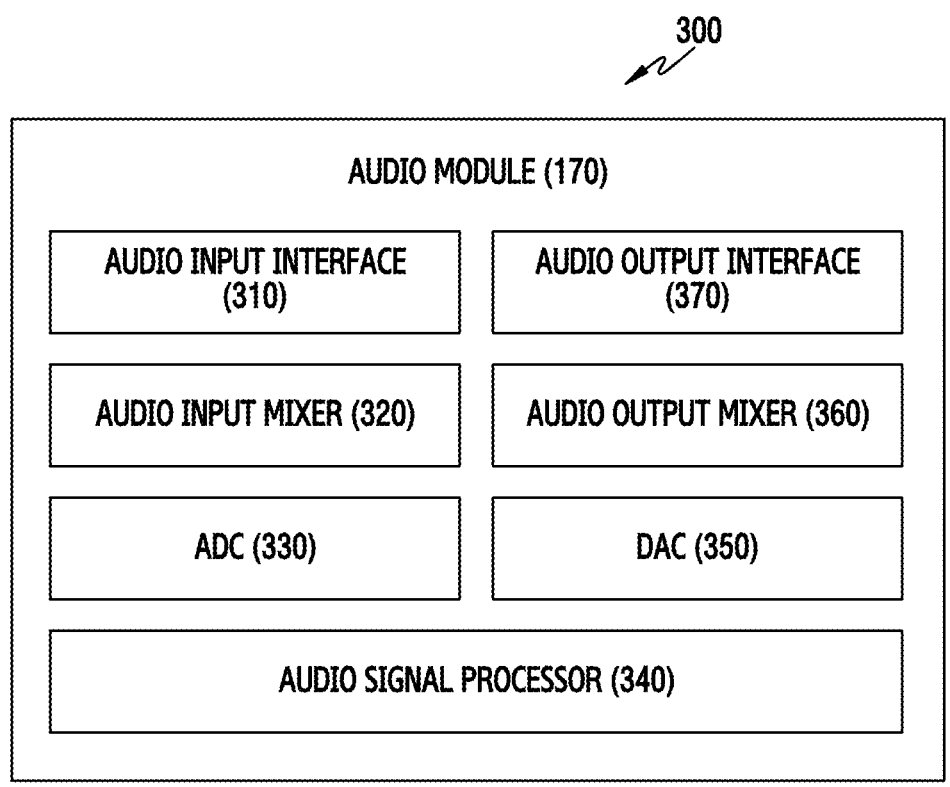
FIG. 3 is a block diagram of an audio module for reproducing an audio signal through an external device according to an embodiment.

FIG. 3 is a block diagram 300 illustrating the audio module 170 according to an embodiment of the present disclosure.

Referring to FIG. 3, the audio module 170 may include, for example, an audio input interface 310, an audio input mixer 320, an analog-to-digital converter (ADC) 330, an audio signal processor 340, a digital-to-analog converter (DAC) 350, an audio output mixer 360, or an audio output interface 370.

The audio input interface 310 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 310 may be connected with the external electronic device 102 directly via the connecting terminal 178, or wirelessly (e.g., Bluetooth™ communication) via the wireless communication module 192 to receive the audio signal. According to an embodiment, the audio input interface 310 may receive a control signal (e.g., a volume adjustment signal received via an input button) related to the audio signal obtained from the external electronic device 102. The audio input interface 310 may include a plurality of audio input channels and may receive a different audio signal via a corresponding one of the plurality of audio input channels, respectively. Additionally or alternatively, the audio input interface 310 may receive an audio signal from another component (e.g., the processor 120 or the memory 130) of the electronic device 101.

The audio input mixer 320 may synthesize a plurality of inputted audio signals into at least one audio signal. For example, according to an embodiment, the audio input mixer 320 may synthesize a plurality of analog audio signals inputted via the audio input interface 310 into at least one analog audio signal.

The ADC 330 may convert an analog audio signal into a digital audio signal. For example, according to an embodiment, the ADC 330 may convert an analog audio signal received via the audio input interface 310 or, additionally or alternatively, an analog audio signal synthesized via the audio input mixer 320 into a digital audio signal.

The audio signal processor 340 may perform various processing on a digital audio signal output from the ADC 330 or a digital audio signal received from another component of the electronic device 101. For example, according to an embodiment, the audio signal processor 340 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. One or more functions of the audio signal processor 340 may be implemented in the form of an equalizer.

The DAC 350 may convert a digital audio signal into an analog audio signal. For example, according to an embodiment, the DAC 350 may convert a digital audio signal processed by the audio signal processor 340 or a digital audio signal obtained from another component (e.g., the processor 120 or the memory 130) of the electronic device 101 into an analog audio signal.

The audio output mixer 360 may synthesize a plurality of audio signals, which are to be outputted, into at least one audio signal. For example, according to an embodiment, the audio output mixer 360 may synthesize an analog audio signal converted by the DAC 350 and another analog audio signal (e.g., received via the audio input interface 310) into at least one analog audio signal.

The audio output interface 370 may output an analog audio signal converted by the DAC 350 or, additionally or alternatively, an analog audio signal synthesized by the audio output mixer 360 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In this case, the audio output interface 370 may output audio signals having a plurality of different channels (e.g., stereo channels or 5.1 channels) via at least some of the plurality of speakers. According to an embodiment, the audio output interface 370 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 320 or the audio output mixer 360, at least one digital audio signal by synthesizing a plurality of digital audio signals using at least one function of the audio signal processor 340.

According to an embodiment, the audio module 170 may include an audio amplifier (e.g., a speaker amplifying circuit) that is capable of amplifying an analog audio signal inputted via the audio input interface 310 or an audio signal that is to be outputted via the audio output interface 370. According to an embodiment, the audio amplifier may be configured as a module separate from the audio module 170.

The electronic device 101 according to an embodiment may be one of various types of electronic devices. The electronic devices may include, for example, a portable communication device (e.g., a smart phone), a computer, a portable multimedia device, a portable medical device, a camera, a wearable device, or a home appliance. However, the electronic devices are not intended to be limited to those described above.

It should be appreciated that various embodiments of the present disclosure and the terms used herein are not intended to limit the present disclosure to a particular embodiment but includes various changes, equivalents, or replacements. With regard to the description of the accompanying drawings, similar reference numerals may be used to refer to similar or related elements. It is to be understood that a singular form of a noun corresponding to an item may include one or more of the items, unless the relevant context clearly indicates otherwise. As used herein, each of such phrases such as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$," "2nd," "first," and "second" may be used to simply distinguish a corresponding component from another, but is not intended to limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may indicate a unit implemented in hardware, software, or firmware, and may interchangeably be used with other terms, for example, "logic," "logic block," "part," or "circuitry". The term "module" may indicate a single integral component, or a minimum unit or part thereof, adapted to perform one or more functions. For example, according to an embodiment, the term "module" may be implemented in a form of an application-specific integrated circuit (ASIC).

An embodiment set forth herein may be implemented as software (e.g., the program 140) including one or more instructions that are stored in a storage medium (e.g., the internal memory 136 or the external memory 138) that is readable by a machine (e.g., the electronic device 101). For example, a processor of the machine may invoke at least one of the one or more instructions stored in the storage medium, and execute the instruction, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave), where this term does not differentiate between where data is semi-permanently stored in the storage medium and where the data is temporarily stored in the storage medium.

According to an embodiment, a method according to an embodiment of the present disclosure may be included and provided in a computer program product. The computer program product may be traded as a product between a seller and a buyer. The computer program product may be distributed in the form of a non-transitory machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the non-transitory machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 4:
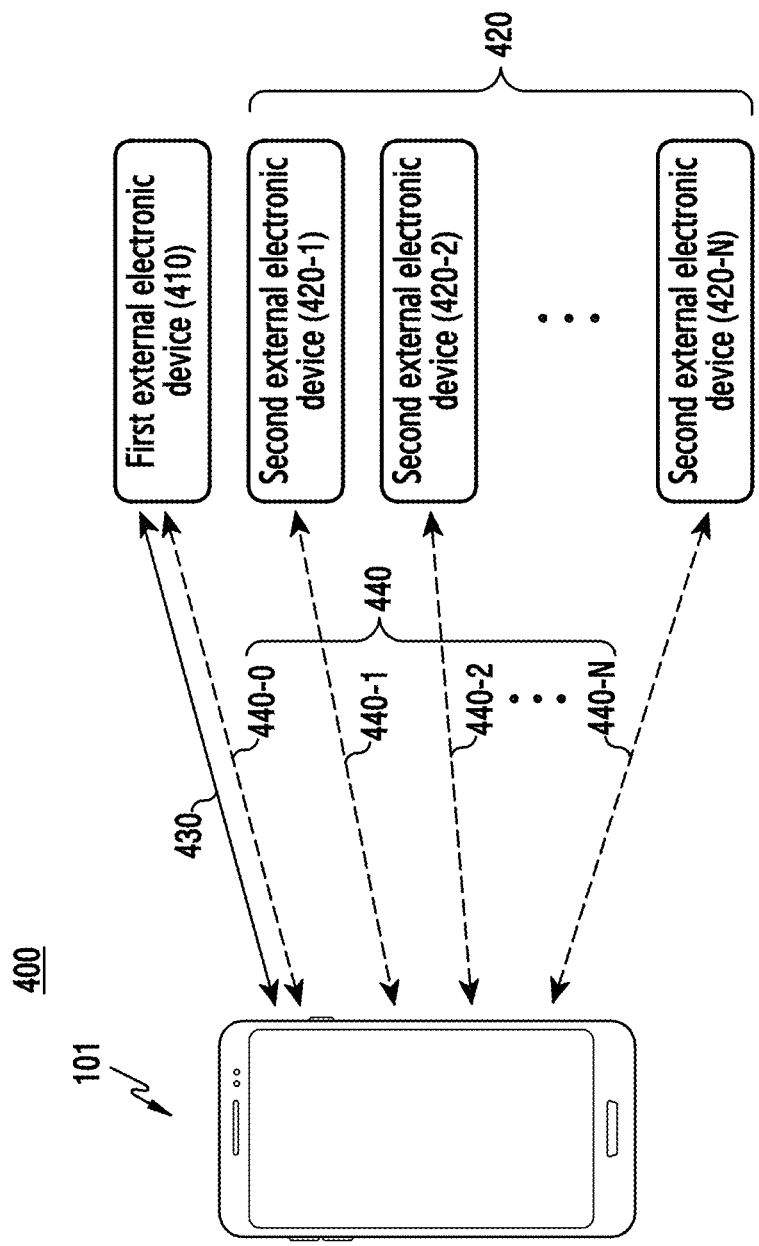
FIG. 4 is an illustration of a wireless environment of an electronic device according to an embodiment.

FIG. 4 is an illustration of a wireless environment of an electronic device according to an embodiment of the present disclosure.

Referring to FIG. 4, the wireless environment 400 may include an electronic device 101 and one or more external electronic devices (e.g., a first external electronic device 410 and one or more second external electronic devices 420 (e.g., 420-1, 420-2, ..., 420-N). The electronic device 101 may communicate with one or more external electronic devices.

The electronic device 101 may be connected to one or more external electronic devices by means of a first communication scheme or may communicate with the same by means of a second communication scheme. The first communication scheme may include Bluetooth (BT). The second communication scheme may include at least one of Bluetooth low energy (BLE), near field communication (NFC), or Wi-Fi direct. The first communication scheme may be different from the second communication scheme.

The electronic device 101 may be connected (e.g., a BT pairing) to one external electronic device (e.g., the first external electronic device 410) through a channel 430 of the first communication scheme. The electronic device 101 may reproduce audio files, and may transmit audio signals related to the reproduced audio files to the first external electronic device 410 connected through the channel 430 of the first communication scheme. The electronic device 101 may communicate (for example, may establish a BLE channel) with one or more external electronic devices (e.g., the first external electronic device 410 and one or more second external electronic devices 420) through a channel 440 of the second communication scheme. The electronic device 101 may transmit channel information related to the channel 430 of the first communication scheme to one or more second external electronic devices 420 through the channel 440 of the second communication scheme.

In the present disclosure, the channel 430 of the first communication scheme may be referred to as a "first communication channel" 430. The channel 440 of the second communication scheme may be referred to as a "second communication channel" 440. The second communication channel 440 may represent second communication channels 440-0, 440-1, 440-2, and 440-N. The second external electronic device 420 may represent a second external electronic device 420-1, a second external electronic device 420-2, and a second external electronic device 420-N.

The first external electronic device 410 may be an external electronic device that establishes the first communication channel 430 (e.g., a BT pairing) with the electronic device 101. The first communication channel 430 may be a one-to-one communication scheme. The first external electronic device 410 may receive an audio signal from the electronic device 101 through the first communication channel 430. The first external electronic device 410 may establish a second communication channel 440-0 (e.g., a BLE channel) with the electronic device 101.

The second external electronic device 420 may establish the second communication channel 440 (e.g., a BLE channel) with the electronic device 101. For example, the first communication channel 430 connected between the electronic device 101 and the first external electronic device 410 may be a one-to-one communication scheme (e.g., in the same manner as BT paring). Thus, when the electronic device 101 is connected to the first external electronic device 410 through the first communication channel 430, the electronic device 101, based on the second communication channel 440 that is different from the first communication channel 430, may establish paths for wireless communication with the second external devices 420. According to an embodiment, the second communication channel 440 may be a one-to-many communication scheme. The electronic device 101 may establish a plurality of second communication channels 440 with a plurality of second external electronic devices 420.

The second external electronic device 420-1 may be connected to the electronic device 101 through the channel 440-1 of the second communication scheme, the second external electronic device 420-2 may be connected to the electronic device 101 through the channel 440-2 of the second communication scheme, and the second external electronic device 420-N may be connected to the electronic device 101 through the channel 440-N of the second communication scheme.

In an embodiment, the electronic device 101 may include content, and the one or more external electronic devices may receive or acquire the content. The electronic device 101 may be a mobile phone, a smart phone, a music player, a laptop computer, or the like, which includes audio sources. The one or more external electronic devices may be audio devices including wireless earphones, speakers, other electronic devices, or the like.

The first external electronic device 410, among the one or more external electronic devices, may receive an audio signal from the electronic device 101 through the first communication channel 430. The first external electronic device 410 may output the received audio signal.

The second external electronic device 420, among the one or more external electronic devices, may acquire (e.g., sniff) the audio signal by accessing the first communication channel 430 using channel information on the first communication channel 430, which is received from the electronic device 101. The second external electronic device 420 may output the acquired audio signal.

The operation, in which the second external electronic device 420 accesses the first communication channel 430 using the channel information on the first communication channel 430 to thus acquire the audio signal transmitted from the electronic device 101 to the first external electronic device 410, may be referred to as "sniffing" or "snooping". "Sniffing" or "snooping" may indicate that an electronic device (e.g., the second external electronic device 420) accesses a communication channel (e.g., the first communication channel 430) between other electronic devices using information on the communication channel, thereby acquiring information transmitted and received through the communication channel.

For example, the second external electronic device 420 may receive channel information on the first communication channel 430 from the electronic device 101 through the second communication channel 440 (e.g., a BLE channel). The second external electronic device 420 may access the first communication channel 430 between the electronic device 101 and the first external electronic device 410 using the received channel information on the first communication channel 430. The second external electronic device 420 may sniff (or snoop or acquire) an audio signal, which is transmitted by the electronic device 101 to the first external electronic device 410 through the first communication channel 430, using the channel information on the first communication channel 430. The second external electronic device 420 may output the sniffed audio signal. The second external electronic device 420 may output the audio signal at almost the same time that the first external electronic device 410 outputs the audio signal.

The channel information on the first communication channel 430 may be referred to as "communication parameters" or "configuration information" related to the first communication channel 430. The communication parameters may be channel information on the first communication (e.g., BT standard communication) channel 430 between the electronic device 101 and the first external electronic device 410. The second external electronic device 420, using the communication parameters, may acquire (sniff or snoop) an audio packet that the electronic device 101 transmits to the first external electronic device 410. For example, in the case where the first communication channel 430 is established by means of a BT standard communication scheme, the communication parameters may include Bluetooth device address (BD_ADDR), logical transport address (LT_ADDR), a native clock (CLKN) of a source (SRC) (e.g., the electronic device 101), a clock offset between the SRC and a sink (SNK) (e.g., the first external electronic device 410), and an encryption parameter (e.g., a key exchange) for a link between the SRC and the SNK.

Figure 5:
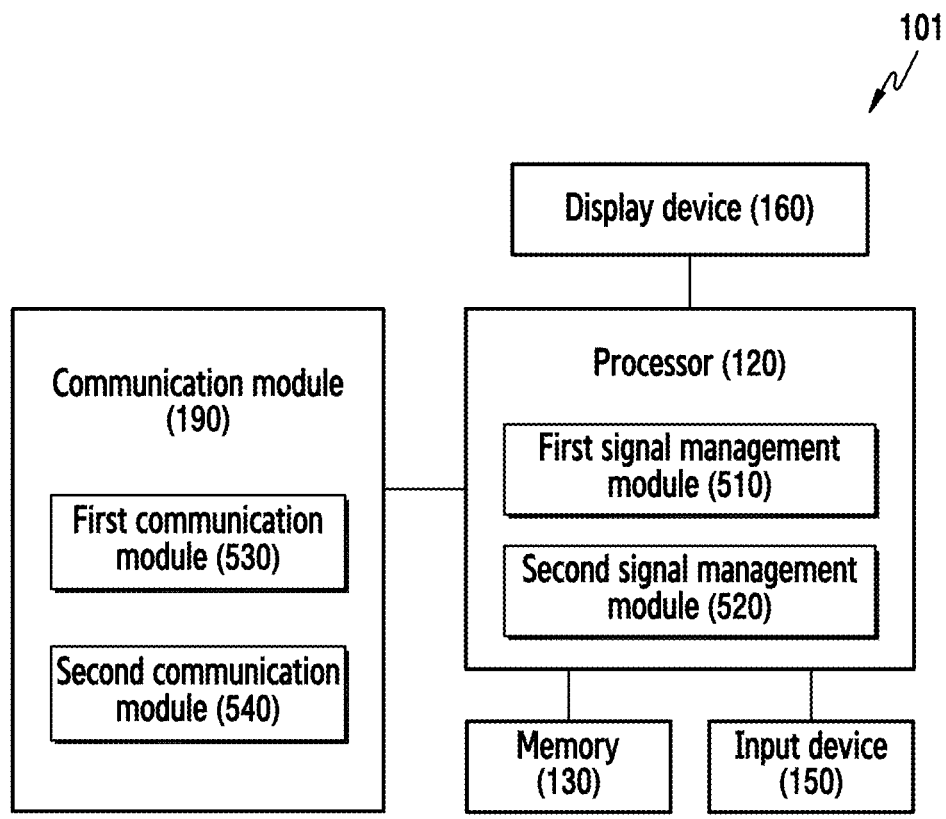
FIG. 5 is a block diagram of an electronic device according to an embodiment.

FIG. 5 is a block diagram of the electronic device 101 according to an embodiment of the present disclosure.

Referring to FIG. 5, the electronic device 101 may include the communication module 190, the processor 120, the display device 160, the input device 150, and the memory 130.

The communication module 190 may be used for communication between one or more external electronic devices (e.g., the first external electronic device 410 and the second external electronic devices 420 in FIG. 4 and the electronic device 104 and the server 108 in FIG. 1) and the electronic device 101.

The communication module 190 may include a first communication module 530 and a second communication module 540. The first communication module 530 may establish a channel 430 of the first communication scheme, and the second communication module 540 may establish a channel 440 of the second communication scheme. In an embodiment, the first communication module 530 and the second communication module 540 may be implemented as one integrated module. The first communication module 530 and the second communication module 540 may be separated from each other.

The first communication module 530 may communicate with the first external electronic device 410 through the first communication channel 430. For example, the first communication module 530 may transmit an audio signal to the first external electronic device 410 through the first communication channel 430.

The second communication module 540 may communicate with the first external electronic device 410 and/or the second external electronic device 420 through the second communication channel 440. For example, the second communication module 540 may receive communication parameters (channel information on the first communication channel 430) from the first external electronic device 410 through the second communication channel 440-0. For example, the second communication module 540 may transmit communication parameters to the second external electronic device 420-1 through the second communication channel 440-1.

The second communication module 540, upon user input, may transmit, to the first external electronic device 410 and/or the second external electronic device 420, additional information on the corresponding external electronic device through the second communication channel 440. The additional information may include audio channel information to be output from the corresponding external electronic device, information on whether or not the corresponding external electronic device is an external important (or designated) electronic device, or information on whether or not the corresponding external electronic device has been selected as a first external electronic device.

The second communication module 540 may receive, from the respective external electronic devices, state information showing the states of the respective external electronic devices through the second communication channel 440. The state information may include a response (e.g., an acknowledgement (ACK) or a negative acknowledgement (NACK)) indicating whether or not each external electronic device has successfully received an audio packet or information related to the remaining amount of battery power of each external electronic device and the like.

The processor 120 may control the overall operation of the electronic device 101. The processor 120 may receive commands from other components (e.g., the communication module 190, the display device 160, the memory 130, or the input device 150), interpret the received commands, and perform calculations or data processing according to the interpreted commands. The processor 120 may be implemented by software, hardware, such as a chip, circuitry, or the like, or a combination of software and hardware.

The processor 120 may include a first signal management module 510 and a second signal management module 520 according to the functions thereof. The first signal management module 510 may control operations related to communication using the channel 430 of the first communication scheme. The second signal management module 520 may control operations related to communication using the channel 440 of the second communication scheme.

The first signal management module 510 may manage first signals transmitted and received through the first communication module 530 by means of the first communication scheme. For example, the first communication scheme may be BT standard communication, and the first signal management module 510 may manage the BT standard communication. The first signal management module 510 may control the first communication module 530 so as to establish a BT channel with the first external electronic device 410 determined by a user input. The first signal management module 510 may transmit, through the BT channel, signals related to audio sources included in the electronic device 101 to the determined first external electronic device 410. The signals related to the audio sources may include audio signals, audio packets, and audio data.

The second signal management module 520 may manage second signals transmitted and received through the second communication module 540 by means of the second communication scheme 540. For example, the second communication scheme may be non-standard communication, and the second signal management module 520 may manage non-standard communication. The non-standard communication may include at least one of BLE, NFC, and Wi-Fi direct. The second signal management module 520 may control the second communication module 540 so as to establish a non-standard communication channel with one or more external electronic devices.

The second signal management module 520 may be a software module driven in the electronic device 101. The second signal management module 520 may be implemented as an application. The second signal management module 520 may store channel information (e.g., communication parameters) regarding the first communication channel 430, and may transmit the communication parameters to the second external electronic device 420 that is to perform sniffing. The communication parameters may be used for the second external electronic device 420 to acquire an audio signal transmitted to the first external electronic device 410. The second signal management module 520 may transmit additional information on the first external electronic device 410 or the second external electronic device 420 through the second communication channel 440. The second signal management module 520 may receive state information indicating the state of the first external electronic device 410 or the second external electronic device 420 through the second communication channel 440.

The second signal management module 520 may detect whether or not the first external electronic device 410, which is connected to the first communication channel 430, supports sniffing. For example, the first external electronic device 410 may transmit or broadcast identification information indicating that the first external electronic device 410 supports sniffing over a certain band of the first communication channel 430. The second signal management module 520, using the identification information, may determine that the first external electronic device 410 supports sniffing. The first external electronic device 410 that supports sniffing may establish the second communication channel 440-0 with the electronic device 101. The first external electronic device 410 that supports sniffing may transmit channel information on the first communication channel 430 to the electronic device 101 through the second communication channel 440-0.

If it is determined that the first external electronic device 410 connected through the first communication channel 430 supports sniffing, the second signal management module 520 may establish the second communication channel 440-0 between the electronic device 101 and the first external electronic device 410. For example, the establishment of the second communication channel 440-0 may be performed based on user input. For example, the establishment of the second communication channel 440-0 may be automatically performed in response to the determination that the first external electronic device 410 supports sniffing.

The processor 120 may acquire communication parameters, which are channel information related to the first communication channel 430. For example, the second signal management module 520 may receive communication parameters from the first external electronic device 410 through the second communication channel 440-0. The second communication channel 440-0 may be a different path from the first communication channel 430. By receiving the communication parameters through the second communication channel 440-0, the electronic device 101 may receive the communication parameters through the second communication channel 440-0 without modifying the platform of the first communication scheme (e.g., BT standard communication). For example, the first signal management module 510 may receive communication parameters from the first external electronic device 410 through the first communication channel 430. The platform of the first communication scheme may be modified in order for the electronic device 101 to receive the communication parameters through the first communication channel 430. By receiving communication parameters through the first communication channel 430, the second signal management module 520 may not be needed.

The second signal management module 520 may control the memory 130 so as to store the acquired communication parameters.

The second signal management module 520 may detect whether or not there is a second external electronic device 420 that supports sniffing in the vicinity thereof. For example, the second external electronic device 420-1, by means of the second communication scheme, may broadcast identification information stating that it supports sniffing. The second signal management module 520 may detect the second external electronic device 420-1, which supports sniffing, using the identification information. The second external electronic device 420-1 supporting sniffing may establish the second communication channel 440-1 with the electronic device 101. The second external electronic device 420-1 supporting sniffing may receive channel information on the first communication channel 430 from the electronic device 101 through the second communication channel 440-1. However, the acquisition of the communication parameters is not limited thereto, and the second external electronic device 420 may acquire communication parameters in any way. The second external electronic device 420-1 supporting sniffing may acquire signals transmitted through the first communication channel 430 using the received communication parameters.

The second signal management module 520 may perform control such that the display device 160 (e.g., a display) outputs a user interface (UI) for displaying the one or more detected second external electronic devices 420 on the screen of the electronic device 101. The second external electronic device 420-2, which has been previously connected to the electronic device 101 through the second communication channel 440-2, may also be displayed on the UI. The first external electronic device 410 connected to the electronic device 101 through the first communication channel 430 may also be displayed on the UI. The second signal management module 520 may detect an input for selecting a second external electronic device for sniffing, among the one or more displayed second external electronic devices 420.

The second signal management module 520 may control the second communication module 540 to establish the channel 440 of the second communication scheme between the electronic device 101 and the second external electronic device 420. For example, the establishment of the second communication channel 440-1 may be performed based on user input. For example, the establishment of the second communication channel 440-2 may be automatically performed based on detecting that the second communication channel 440-2 has been previously established between the electronic device 101 and the second external electronic device 420-2. When the previously established second communication channel 440-2 is used by another external electronic device (e.g., the first external electronic device 410 or the second external electronic device 420-1), a new second communication channel may be established.

The processor 120 may perform control such that the communication module 190 transmits the stored communication parameters to the second external electronic device 420 selected based on the UI. For example, the second signal management module 520 may perform control such that the second communication module 540 transmits the communication parameters to the second external electronic device 420-1 through the second communication channel 440-1. For example, the first signal management module 510 may perform control such that the first communication module 530 broadcasts the communication parameters using a broadcast band of the first communication channel 430. However, the transmission of the communication parameters is not limited thereto, and the second external electronic device 420-1 may acquire the communication parameters in any way. The second external electronic device 420-1, using the communication parameters, may acquire (sniff or snoop) an audio packet that the electronic device 101 transmits to the first external electronic device 410.

The second signal management module 520 may perform control such that the second communication module 540 transmits additional information for each of one or more external electronic devices through the channel of the second communication scheme (e.g., the second communication channel 440-0 or 440-1) for each of the one or more external electronic devices. The additional information may include audio channel information to be output from the corresponding external electronic device, information on whether or not the corresponding external electronic device is an external important (or designated) electronic device, or information on whether or not the corresponding external electronic device has been selected as a first external electronic device. The additional information may be transmitted to the corresponding external electronic devices in response to detection of an input for setting the additional information in the electronic device 101.

In an embodiment, the additional information may include audio channel information indicating the audio channel to be output from the corresponding external electronic device. The audio channel may include a right channel (an R-channel), a left channel (an L-channel), or a stereo (right and left) channel. The processor 120 may perform control such that the display device 160 outputs a UI for displaying audio channel information to be output from each external electronic device.

The processor 120, based on the UI, may receive an input for selecting an audio channel to be output from each external electronic device. The processor 120 may display the selected audio channel information on the UI along with the respective external electronic devices corresponding thereto. The second signal management module 520 may transmit the selected audio channel information to each external electronic device through the second communication channels 440.

Each external electronic device, based on the audio channel information, may mute the R-channel of the audio packet received from the electronic device 101 to thus output only the L-channel, may mute the L-channel of the same to thus output only the R-channel, or may output both the L-channel and the R-channel. The audio channel information is described below in more detail with reference to FIG. 13. According to an embodiment, audio channel information to be output from the respective external electronic devices may be stored in the respective external electronic devices. The second signal management module 520 may receive audio channel information from the respective external electronic devices through the second communication channels 440. The processor 120 may display, on the UI, the received audio channel information along with the respective external electronic devices corresponding thereto.

In an embodiment, the additional information may include information on whether or not the corresponding external electronic device is an external important electronic device. The external important electronic device may be intended to detect loss of an audio packet and to feed the same back. For example, if the external important electronic device has successfully received an audio packet, the external important electronic device may transmit a response (e.g., an ACK) indicating the receipt of the audio packet to the electronic device 101 through the second communication channel 440. If the external important electronic device has failed to receive an audio packet, the external important electronic device may transmit a response (e.g., a NACK) indicating that the external important electronic device has failed to receive an audio packet to the electronic device 101 through the second communication channel 440.

The processor 120 may perform control such that the display device 160 outputs a UI for displaying whether or not the respective external electronic devices are external important electronic devices. For example, the processor 120, based on the UI, may receive an input for selecting an external important electronic device from among one or more external electronic devices. The processor 120 may transmit, to one or more external electronic devices, the information on whether or not the one or more external electronic devices are external important electronic devices through the second communication channel 440. The external important electronic device is described below in more detail with reference to FIGS. 13 and 14.

In an embodiment, the additional information may include information indicating whether or not the corresponding external electronic device is set as a first external electronic device 410. For example, an event, which causes a change in the first external electronic device 410, may occur while an audio packet is transmitted to the first external electronic device 410 through the first communication channel 430. The event that causes a change in the first external electronic device 410 may be related to at least one of a user input, the remaining amount of battery power of the first external electronic device 410, or the signal strength of one of either the first communication channel 430 connected to the first external electronic device 410 or the second communication channel 440-0. A change in the first external electronic device 410 is described below in more detail with reference to FIGS. 13 and 15.

If an event occurs, which causes a change in the first external electronic device 410, the first external electronic device 410 may be changed. If the first external electronic device 410 is changed, the second signal management module 520 may transmit, to the original first external electronic device 410, information stating that it is no longer the first external electronic device 410. The information may be transmitted through the second communication channel 440-0 between the electronic device 101 and the original first external electronic device 410. If the first external electronic device 410 is changed, the second signal management module 520 may transmit, to a new external electronic device (e.g., the second external electronic device 420-1), information stating that it has been set as a new first external electronic device 410. The information may be transmitted through the second communication channel (e.g., the second communication channel 440-1) between the electronic device 101 and the new first external electronic device. For example, even when the first communication channel 430 is disconnected, or even when there is loss of the first communication channel 430, the first external electronic device 410 may be changed.

The new first external electronic device may perform the operation of the original first external electronic device 410 using pre-acquired communication parameters (e.g., channel information on the first communication channel 430 between the electronic device 101 and the original first external electronic device 410). For example, the role of the second external electronic device 420-1, which has received the information stating that it has been set as a new first external electronic device from the electronic device 101, may be virtually converted to the role of the original first external electronic device 410. The new first external electronic device may not be in the actual state of being paired with the electronic device 101. The new first external electronic device may be in a state that is not substantially paired with the electronic device 101.

The second signal management module 520 may receive, from one or more external electronic devices (e.g., the first external electronic device 410 and the second external electronic devices 420), state information indicating the states of the one or more external electronic devices through the second communication module 540. The state information may be received through the second communication channels 440 (e.g., the second communication channels 440-0 and 440-1). The state information on the one or more external electronic devices may include a response (e.g., an ACK or a NACK) indicating whether or not the one or more external electronic devices have successfully received an audio packet or the remaining amounts of battery power of the one or more external electronic devices.

The second signal management module 520 may receive, from one or more external electronic devices, a response indicating whether or not the one or more external electronic devices have successfully received an audio packet through the second communication module 540. The ACK or the NACK may be received from the above-described external important electronic device through the second communication channel 440. The external important electronic device may be selected from one or more external electronic devices based on user input. For example, if the $k^{th}$ audio packet has been successfully received, the external important electronic device (e.g., the first external electronic device 410) may transmit an ACK to the second signal management module 520 of the electronic device 101 through the second communication channel (e.g., the second communication channel 440-0). If the external important electronic device (e.g., the second external electronic device 420-1) has failed to receive the $k^{th}$ audio packet, the external important electronic device may transmit a NACK to the second signal management module 520 of the electronic device 101 through the second communication channel (e.g., the second communication channel 440-1). An external electronic device (e.g., the second external electronic device 420-2) other than the external important electronic device may not transmit an ACK or NACK to the electronic device 101. If one of the external important electronic devices (e.g. the second external electronic device 420-1) has failed to receive the $k^{th}$ audio packet, the first signal management module 510 of the electronic device 101 may retransmit the $k^{th}$ audio packet to the first external electronic device 410 through the first communication channel 430. The external important electronic device (e.g., the second external electronic device 420-1) that has failed to receive the $k^{th}$ audio packet may re-sniff the retransmitted $k^{th}$ audio packet using the communication parameters. The external important electronic devices may receive all of the audio packets without missing the same because the $k^{th}$ audio packet is retransmitted.

The transmission time of the ACK or the NACK may vary. For example, the external important electronic device (e.g., the first external electronic device 410) may transmit an ACK through the second communication channel (e.g., the second communication channel 440-0) at the time at which the $k^{th}$ audio packet is received. For example, if the external important electronic device (e.g., the second external electronic device 420-1) fails to receive the $k^{th}$ audio packet until a designated time, the external important electronic device may transmit a NACK through the second communication channel (e.g., the second communication channel 440-1) at the designated time. For example, the external important electronic device may periodically transmit an ACK or a NACK through the second communication channel 440.

The second signal management module 520 may receive information on the remaining amounts of battery power of one or more external electronic devices from the one or more external electronic devices through the second communication module 540. The information on the remaining amounts of battery power of the one or more external electronic devices may be received through the second communication channels 440.

In an embodiment, the information on the remaining amount of battery power of the first external electronic device 410 may be used as one of the events that cause a change in the first external electronic device 410, as described above. For example, if the remaining amount of battery power of the original first external electronic device 410 is less than a reference amount of battery power, the first external electronic device 410 may be changed. For example, if the remaining amount of battery power of the second external electronic device 420-1 is greater than the remaining amount of battery power of the original first external electronic 410, the second external electronic device 420-1 may be set as a new first external electronic device.

In an embodiment, information on the remaining amounts of battery power of one or more second external electronic devices 420 may be used as a criterion for determining a new first external electronic device. For example, when an event, which causes a change in the first external electronic device 410, is detected, the processor 120 (e.g., the second signal management module 520) may determine the second external electronic device (e.g., the second external electronic device 420-1) having the maximum remaining amount of battery power to be a new first external electronic device, among one or more second external electronic devices 420. For example, the processor 120 may use the remaining amounts of battery power of one or more second external electronic devices 420 as one of the factors serving as criteria for determining a new first external electronic device.

Based on weight values of the remaining amounts of battery power of one or more second external electronic devices 420 and weight values of other factors, the processor 120 may determine a new first external electronic device. The other factors may include the signal strengths of the second communication channels 440 of one or more second external electronic devices 420.

The processor 120, based on user input, may set a criterion for determining a new first external electronic device. The processor 120 may perform control such that the display device 160 outputs a UI for displaying a criterion for determining a new first external electronic device. The processor 120, based on the UI, may receive an input to set a criterion for determining a new first external electronic device.

The processor 120 may receive information on the remaining amounts of battery power of the external electronic devices through the second communication channels 440. For example, the respective external electronic devices may periodically transmit information on the remaining amounts of battery power thereof through the respective second communication channels 440. For example, an external important electronic device, among one or more external electronic devices, may include information on the remaining amount of battery power of the external important electronic device in an ACK or a NACK packet, and may transmit the same. It is possible to reduce the amount of data transmission through the second communication channels 440 by including the information on the remaining amount of battery power in the ACK or the NACK packet.

In an embodiment, the first signal management module 510 and the second signal management module 520 may be separated in the electronic device 101. For example, the first signal management module 510 may control signals related to BT standard communication, and the second signal management module 520 may control signals related to BLE non-standard communication. Communication parameters for sniffing may be transmitted and received without modifying the platform of the first communication scheme (e.g., BT standard communication) by separating the first signal management module 510 and the second signal management module 520.

In an embodiment, the first signal management module 510 and the second signal management module 520 may not be separated in the electronic device 101. For example, the electronic device 101 may receive communication parameters through the first communication channel 430. For example, the electronic device 101 may broadcast the communication parameters using a broadcast band of the first communication channel 430, thereby enabling the second external electronic device 420 to acquire the communication parameters. Since the first signal management module 510 and the second signal management module 520 are not separated, the platform of the first communication scheme may be modified. The electronic device 101 may transmit and receive communication parameters using the first communication channel 430, and thus may not need the second signal management module 520. It may not be necessary to install an application related to the second signal management module 520 by transmitting and receiving communication parameters using the first communication channel 430.

In an embodiment, the first signal management module 510 and the second signal management module 520 may be included in different electronic devices, respectively. For example, the first signal management module 510 may be included in an electronic device that includes sound sources, and the second signal management module 520 may be included in a terminal for managing one or more external electronic devices. The electronic device including the sound sources may establish the first communication channel 430 with the first external electronic device 410 using the first signal management module 510, and may transmit an audio packet through the established first communication channel 430. The terminal for managing one or more external electronic devices may establish the second communication channel 440-0 with the first external electronic device 410 using the second signal management module 520, may receive communication parameters through the established second communication channel 440-0, and may store the received communication parameters. The terminal for managing one or more external electronic devices may establish the second communication channels 440 with the second external electronic devices 420 using the second signal management module 520, and may transmit communication parameters for sniffing through the second communication channels 440.

The display device 160 may display a screen of the electronic device 101. The display device 160 may include one of a liquid crystal display (LCD), a light-emitting diode (LED), an organic light-emitting diode (OLED), or a quantum-dot light-emitting diode (QLED). The display device 160 may display a variety of information. In an embodiment, the display device 160 may display a UI for selecting (e.g., a BT pairing) the first external electronic device 410 to transmit an audio packet. The display device 160 may display a UI for managing one or more external electronic devices (e.g., a UI of a sniffing management application). For example, the display device 160 may display a UI for selecting the second external electronic device 420 for sniffing. For example, the display device 160 may display a UI for setting additional information on one or more external electronic devices. The additional information may include audio channel information to be output from one or more external electronic devices, information on whether or not one or more external electronic devices are external important electronic devices, or information on whether or not one or more external electronic devices are selected as first external electronic devices. For example, the display device 160 may display a UI for displaying the remaining amounts of battery power of one or more external electronic devices. For example, the display device 160 may display a UI for displaying a criterion for determining a new first external electronic device when an event, which causes a change in the first external electronic device, occurs. For example, the display device 160 may display a UI for canceling the connection of the second communication channel 440 with the second external electronic device 420.

The display device 160 may be operatively or functionally connected to the processor 120.

The input device 150 may receive instructions or data from a user. The input device 150 may receive a user input on the UI displayed through the display device 160. For example, the input may include at least one of an input for selecting the first external electronic device 410 for transmitting an audio packet, an input for selecting the second external electronic device 420 for sniffing, an input for selecting additional information on one or more external electronic devices, an input for selecting a criterion for determining a new first external electronic device, or an input for canceling the connection of the second communication channel 440.

The input device 150 may be a touch panel coupled to the display device 160. The input device 150 may sense a touch input or a hovering input by a finger or a pen. Various types of inputs may be received by the input device 150. For example, the input received by the input device 150 may include touch-and-release, drag-and-drop, and the like. The input device 150 may provide the processor 120 with the received input and data related to the received input.

The input device 150 may be operatively or functionally connected to the processor 120.

The memory 130 may refer to one or more memory sets. Based on the signaling with the processor 120, the memory 130 may execute instructions stored in the memory 130. The memory 130 may store data and/or commands received from, or generated by, other components (e.g., the processor 120, the first signal management module 510, the second signal management module 520, and the like). For example, the memory 130 may store (or may temporarily store) communication parameters received from the first external electronic device 410. For example, the memory 130 may store (or may temporarily store) additional information on one or more external electronic devices. For example, the memory 130 may store (or may temporarily store) ACKs/NACKs received from external important electronic devices. For example, the memory 130 may store (or may temporarily store) information on the remaining amount of battery power, which is received from one or more external electronic devices.

The memory 130 may be operatively or functionally connected to the processor 120 (or the first signal management module 510 or the second signal management module 520).

Figure 6:
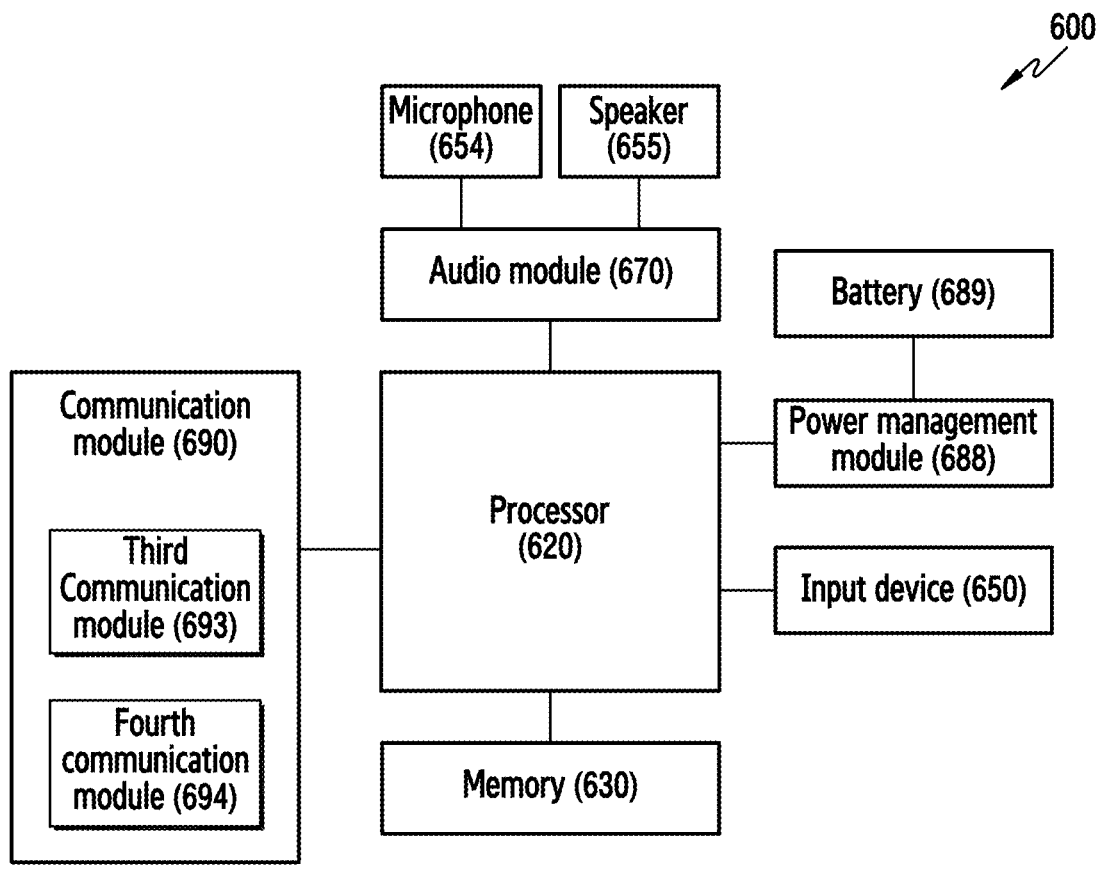
FIG. 6 is a block diagram of an external electronic device according to an embodiment.

FIG. 6 is a block diagram of an external electronic device 600 according to an embodiment. The external electronic device 600 may include the first external electronic device 410 or the second external electronic device 420. The external electronic device 600 may be an audio device including wireless earphones, speakers, and the like.

Referring to FIG. 6, the external electronic device 600 may include a communication module 690, a memory 630, an audio module 670, a microphone 654, a speaker 655, a power management module 688, a battery 689, an input device 650, and a processor 620.

The communication module 690 may be used for communicating with the electronic device 101. The communication module 690 may include a third communication module 693 and a fourth communication module 694. The third communication module 693 may establish a channel 430 of the first communication scheme. For example, the third communication module 693 may establish a BT standard communication channel. The third communication module 693 may communicate (e.g., a BT pairing) with the electronic device 101 through the first communication channel 430. For example, in a case where the external electronic device 600 is the first external electronic device 410, the third communication module 693 may receive audio signals or audio packets from the electronic device 101 through the first communication channel 430.

The fourth communication module 694 may establish a channel 440 of the second communication scheme. For example, the fourth communication module 694 may establish a non-standard communication channel. The non-standard communication may include at least one of BLE, NFC, and Wi-Fi direct. The fourth communication module 694 may communicate (for example, may establish a BLE channel) with the electronic device 101 through the channel 440 of the second communication scheme. For example, in a case where the external electronic device 600 is the first external electronic device 410, the fourth communication module 694 may transmit communication parameters to the electronic device 101 through the second communication channel 440-0. For example, in a case where the external electronic device 600 is the second external electronic device 420, the fourth communication module 694 may receive communication parameters from the electronic device 101 through the second communication channel 440. For example, in a case where the external electronic device 600 is the second external electronic device 420, the communication module 690 (e.g. the third communication module 693) may access the first communication channel 430 between the electronic device 410 and the first external electronic device 410 using communication parameters.

The communication module 690 may acquire (or sniff) audio packets from the first communication channel 430 using communication parameters. The communication module 690 may acquire audio packets, which are transmitted to the first external electronic device 410 by the electronic device 101, using communication parameters.

The fourth communication module 694 may receive additional information on the external electronic device 600 from the electronic device 101 through the second communication channel 440. The additional information may include audio channel information to be output from the external electronic device 600, information on whether or not the external electronic device 600 has been set as an external important electronic device, or information on whether or not the external electronic device 600 has been selected as a first external electronic device. For example, the fourth communication module 694 may transmit, to the electronic device 101, audio channel information, which is to be output from the external electronic device 600, through the second communication channel 440.

The fourth communication module 694 may transmit state information on the external electronic device 600 to the electronic device 101 through the second communication channel 440. The state information may include the remaining amount of battery power of the external electronic device 600. In a case where the external electronic device 600 is set as an external important electronic device, the state information may include a response (e.g., an ACK or a NACK) indicating whether or not the external electronic device 600 has successfully received an audio packet. When an audio packet has been successfully received, the external electronic device 600 set as an external important electronic device may transmit an ACK to the electronic device 101 through the second communication channel 440. If the external electronic device 600 set as an external important electronic device has failed to receive an audio packet, the external electronic device 600 may transmit a NACK to the electronic device 101 through the second communication channel 440.

In an embodiment, in a case where the external electronic device 600 operates as the first external electronic device 410, both the third communication module 693 and the fourth communication module 694 may be used. In a case where the external electronic device 600 operates as the second external electronic device 420, only the fourth communication module 694 may be used. For example, the third communication module 693 and the fourth communication module 694 may be separated from each other. For example, the third communication module 693 and the fourth communication module 694 may be one communication module.

In an embodiment, the external electronic device 600 (e.g. the first external electronic device 410 or the second external electronic device 420) may use only the third communication module 693 supporting the first communication scheme. In this case, the fourth communication module 694 supporting the second communication scheme may not be included in the external electronic device 600. For example, the first external electronic device 410 may transmit communication parameters to the electronic device 101 through the first communication channel 430. For example, the second external electronic device 420 may receive communication parameters broadcast by the electronic device 101 using a broadcast band of the first communication channel 430.

The memory 630, based on the signaling with the processor 620, may execute instructions stored in the memory 630. The memory 630 may store data and/or commands received from, or generated by, other components (e.g., the processor 620, the communication module 690, the third communication module 693, the fourth communication module 694, the input device 650, the power management module 688, the audio module 670, and the like). For example, in a case where the external electronic device 600 is the first external electronic device 410, the memory 630 may store (or may temporarily store) communication parameters acquired by establishment of the first communication channel 430. In a case where the external electronic device 600 is the second external electronic device 420, the memory 630 may store communication parameters received from the electronic device 101. The memory 630 may store additional information on the external electronic device 600 or information on the remaining amount of battery power of the external electronic device 600, which is received from the electronic device 101. In a case where the external electronic device 600 is the first external electronic device 410, the memory 630 may store audio packets received from the electronic device 101 through the first communication channel 430. In a case where the external electronic device 600 is the second external electronic device 420, the memory 630 may store audio packets acquired (or sniffed) from the first communication channel 430 using communication parameters.

The memory 630 may be operatively or functionally connected to the processor 620.

The audio module 670 may process sound signals to be output through the speaker 655. For example, the audio module 670 may convert the audio signal provided from the processor 620. The audio signal provided from the processor 620 may correspond to an audio packet received through the communication module 690. For example, in a case where the external electronic device 600 is the first external electronic device 410, the processor 620 may provide the audio module 670 with an audio signal received through the third communication module 693. In a case where the external electronic device 600 is the second external electronic device 420, the processor 620 may provide the audio module 670 with an audio signal sniffed through the communication module 690 (e.g., the third communication module 693). The audio module 670 may convert the provided audio signal into an analog signal. The converted analog signal may be output through the speaker 655. The first external electronic device 410 and the second external electronic device 420 may simultaneously output audio signals.

The microphone 654 may be used to receive voice signals. For example, in the case where the external electronic device 600 is a wireless earphone, the microphone 654 may be used to receive a user's voice signal. The microphone 654 may provide the received voice signal to the processor 620 through the audio module 670.

The speaker 655 may output audio signals. For example, the speaker 655 may output an audio signal provided from the processor 620 through the audio module 670. The audio signal may correspond to an audio packet received through the communication module 690. The first external electronic device 410 may output, by means of the speaker 655, the audio signal received through the first communication channel 430. The second external electronic device 420 may output, through the speaker 655, the audio signal sniffed from the first communication channel 430 using communication parameters.

The power management module 688 may manage power of the external electronic device 600. For example, the power management module 688 may measure the remaining amount of the battery 689 of the external electronic device 600. The power management module 688 may provide the processor 620 with information on the remaining amount of the battery 689 of the external electronic device 600. The information on the remaining amount of the battery 689 of the external electronic device 600 may be transmitted to the electronic device 101 through the second communication channel 440.

In an embodiment, the information on the remaining amount of the battery 689 of the first external electronic device 410 may be used as one of the events that cause a change in the first external electronic device. For example, if the remaining amount of battery power of the external electronic device 600 (e.g., the first external electronic device 410) is less than a reference amount of battery power, the external electronic device 600 may receive, from the electronic device 101, information stating that it is no longer the first external electronic device through the fourth communication module 694.

In an embodiment, information on the remaining amount of the battery 689 of the second external electronic devices 420 may be used as a criterion for determining a new first external electronic device. For example, based on the electronic device 101 detecting an event that causes a change in the first external electronic device, an external electronic device 600 (e.g., the second external electronic device 420-1) having the maximum remaining amount of battery power, among one or more second external electronic devices 420, may receive information stating that it has been set as a new first external electronic device through the fourth communication module 694. The role of the external electronic device 600 (e.g., the second external electronic device 420-1) may be changed to the role of the original first external electronic device 410.

The input device 650 may receive instructions or data from a user. The input device 650 may be used to adjust the volume of an audio signal output through the external electronic device 600 (e.g., wireless earphones or speakers), or may be used for reproducing a next song. For example, the input device 650 may be a touch panel. The input device 650 may sense a touch input or a hovering input by a finger or a pen. For example, the input device 650 may be physical keys or hard keys. The input device 650 may provide the processor 620 with the received input and data related to the received input.

The input device 650 may receive an input for initiating a sniffing operation. In response to the reception of the input for initiating a sniffing operation, the external electronic device 600 may receive communication parameters from the electronic device 101, may sniff an audio packet from the first communication channel 430 using the received communication parameters, or may output the sniffed audio packet. The input for initiating the sniffing operation may also be received through the input device 150 of the electronic device 101.

The input device 650 may be operatively or functionally connected to the processor 620.

The processor 620 may control the overall operation of the external electronic device 600.

The processor 620 may receive commands from other components (e.g., the communication module 690, the third communication module 693, the fourth communication module 694, the memory 630, the audio module 670, the power management module 688, the input device 650, and the like), may interpret the received commands, and may perform calculations or data processing according to the interpreted commands. In an embodiment, the processor 620 may include a plurality of processors. For example, the processor 620 may include a module for controlling signals transmitted and received through the third communication module 693, and a module for controlling signals transmitted and received through the fourth communication module 694.

In the case where the external electronic device 600 is the first external electronic device 410, the processor 620 may perform control such that the third communication module 693 establishes the first communication channel 430 (e.g., a BT pairing) with the electronic device 101. The processor 620 may receive audio signals (or audio packets) from the electronic device 101 through the first communication channel 430. The processor 620 may perform control such that the audio module 670 outputs the received audio signals through the speaker 655.

In a case where the external electronic device 600 is the second external electronic device 420, the processor 620 may perform control such that the fourth communication module 694 establishes the second communication channel 440 (e.g., a BLE channel) with the second communication channel 440. The processor 620 may receive communication parameters (channel information on the first communication channel 430) from the electronic device 101 through the second communication channel 440. The processor 620 may perform control such that the communication module 690 (e.g., the third communication module 693) sniffs an audio signal transmitted to the first external electronic device 410 by the electronic device 101 by accessing the first communication channel 430 using the communication parameters. The processor 620 may perform control such that the audio module 670 outputs the sniffed audio signal through the speaker 655.

The processor 620 of the external electronic device 600 may perform control such that the fourth communication module 694 establishes the second communication channel 440 with the electronic device 101. The processor 620 may receive additional information on the external electronic device 600 from the electronic device 101 through the second communication channel 440. The processor 620 may transmit state information indicating the state of the external electronic device 600 to the electronic device 101 through the second communication channel 440.

Figure 7:
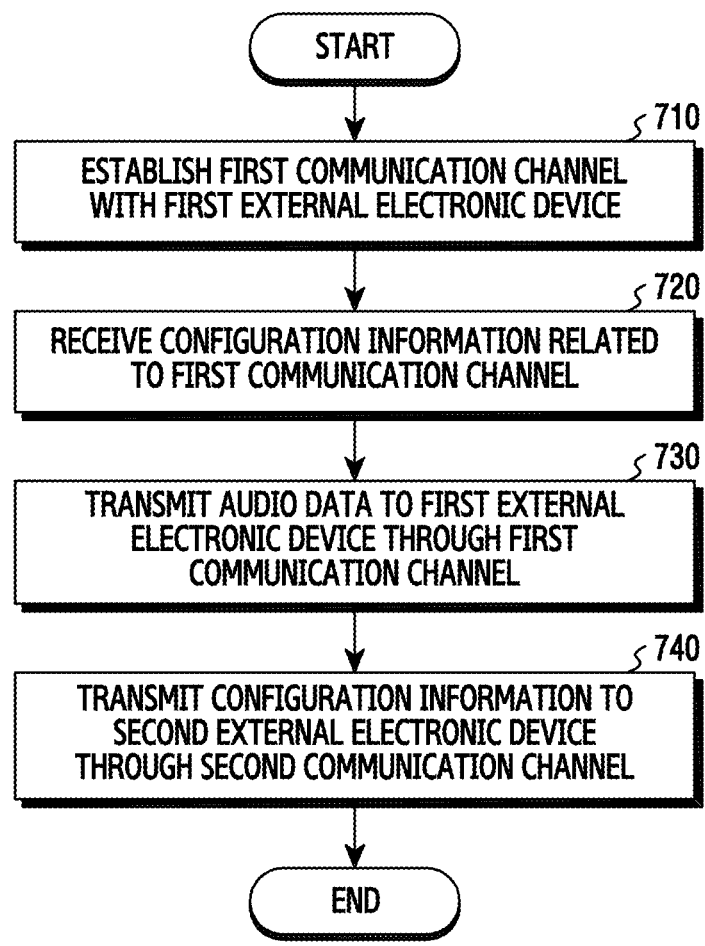
FIG. 7 is a flowchart of an operation of an electronic device according to an embodiment.

FIG. 7 is a flowchart of an operation of an electronic device according to an embodiment of the present disclosure. This operation may be performed by an electronic device 101 that includes audio sources.

Referring to FIG. 7, in step 710, a processor 120 (or the first signal management module 510) may perform control such that a communication module 190 (or the first communication module 530) establishes a first communication channel 430 with a first external electronic device 410. The first communication channel 430 may be used by the electronic device 101 to transmit audio signals to the first external electronic device 410. The processor 120 may acquire channel information (e.g., communication parameters) on the first communication channel 430 through any path.

In step 720, the processor 120 (or the second signal management module 520) may receive configuration information (e.g., communication parameters) related to the first communication channel 430. For example, the processor 120 may receive communication parameters from the first external electronic device 410 through a second communication channel 440-0. The second communication channel 440-0 between the electronic device 101 and the first external electronic device 410 may be a different path from the first communication channel 430. The processor 120 may establish the second communication channel 440-0 using a second communication module 540. The processor 120 may establish, based on a user input, the second communication channel 440-0, establish, based on reception of a user input through the first external electronic device 410, the second communication channel 440-0, or automatically establish the second communication channel 440-0 in response to detecting that the first external electronic device 410 supports sniffing. For example, the processor 120 may receive communication parameters from the first external electronic device 410 through the first communication channel 430.

In step 730, the processor 120 may transmit audio data to the first external electronic device 410 through the first communication channel 430. The audio data may be output through the first external electronic device 410.

In step 740, the processor 120 may transmit communication parameters to the second external electronic device 420. For example, the processor 120 may establish a second communication channel 440-1 with a second external electronic device 420-1. The processor 120 may establish, based on a user input, the second communication channel 440-1, establish, based on reception of a user input through the second external electronic device 420-1, the second communication channel 440-1, or automatically establish the second communication channel 440-1 in response to detecting that the second external electronic device 420-1 supports sniffing. The processor 120 may transmit communication parameters to the second external electronic device 420-1 through the established second communication channel 440-1.

The communication parameters may be used for the second external electronic device 420 to acquire (or sniff) an audio signal from the first communication channel 430.

Figure 8:
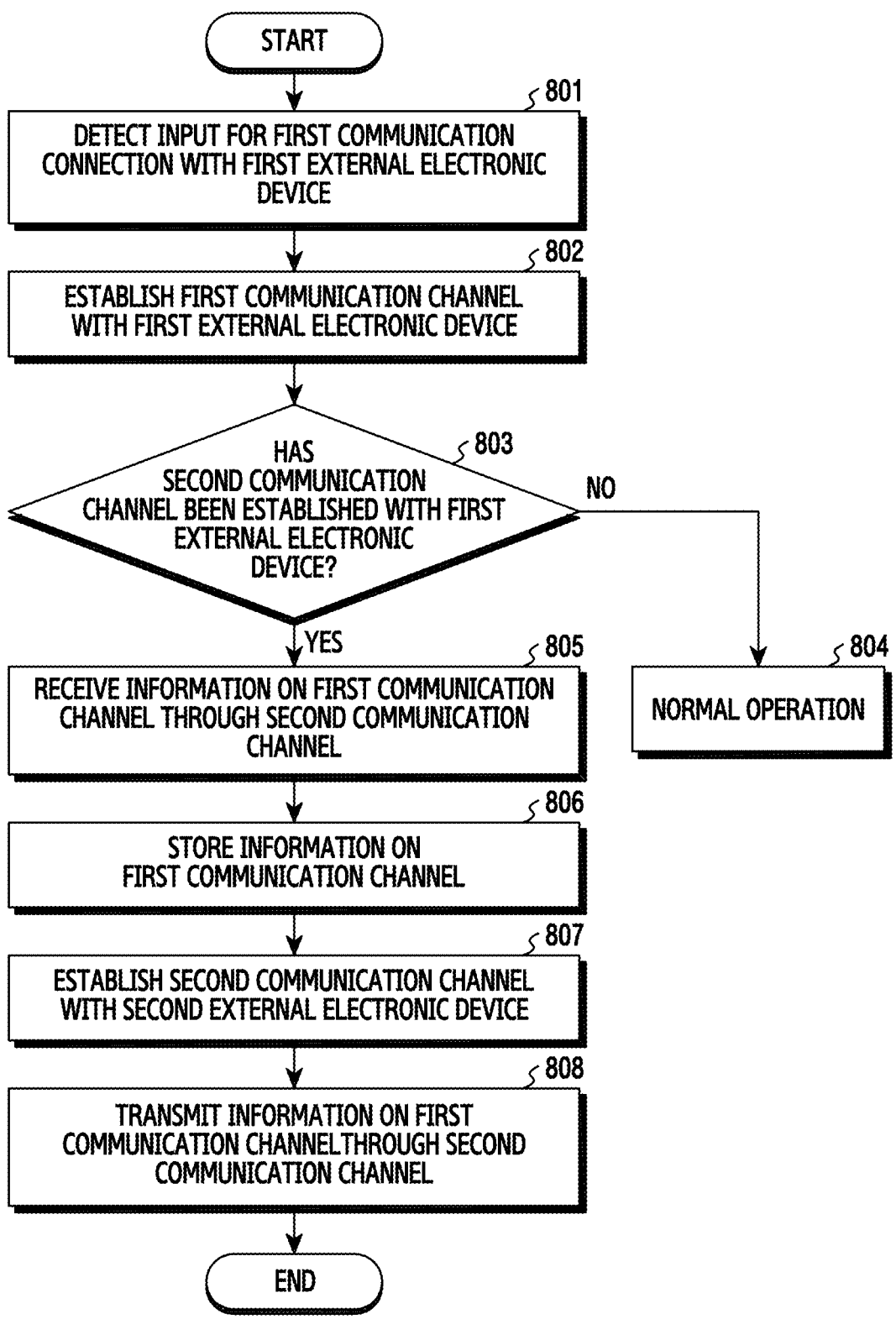
FIG. 8 is a flowchart of an operation of an electronic device according to an embodiment.

FIG. 8 is a flowchart of an operation of an electronic device according to an embodiment of the present disclosure. This operation may be performed by an electronic device 101 that includes audio sources.

Referring to FIG. 8, in step 801, a processor 120 (or the first signal management module 510) may detect an input for a first communication connection (e.g., a BT connection) with a first external electronic device 410. For example, the input may be intended to select a first external electronic device 410 to be connected by the first communication, among one or more external electronic devices that are available for the first communication connection. The first communication scheme may be BT standard communication.

In step 802, the processor 120, based on the input, may establish a first communication channel 430 with the selected first external electronic device 410. The first communication channel 430 may be a channel of the first communication scheme.

In step 803, the processor 120 may determine whether or not the second communication channel 440-0 with the first external electronic device 410 has been established. For example, the processor 120, based on a UI, may receive a user input for establishing the second communication channel 440-0 with the first external electronic device 410. The processor 120, based on user input, may establish the second communication channel 440-0. For example, the processor 120 may automatically establish the second communication channel 440-0 in response to detecting that the first external electronic device 410 supports sniffing. For example, in response to detecting that the first external electronic device 410 has been previously connected to the electronic device 101 through the second communication channel 440-0, the processor 120 may automatically establish the second communication channel 440-0. For example, the processor 120 may receive a signal indicating a user input for establishing the second communication channel 440-0, which is input through the first external electronic device 410. Based on reception of a signal from the first external electronic device 410, the processor 120 may establish the second communication channel 440-0.

In step 804, based on detecting that the second communication channel 440-0 with the first external electronic device 410 has not been established, the processor 120 may perform normal operations. For example, the processor 120 may transmit an audio signal through the first communication channel 430 (e.g., a BT pairing) between the electronic device 101 and the first external electronic device 410.

In step 805, based on detecting that the second communication channel 440-0 with the first external electronic device 410 has been established, the processor 120 may receive communication parameters through the second communication channel 440-0. In step 806, the processor 120 may store the received communication parameters concerning the first communication channel 410.

In step 807, the processor 120 may establish the second communication channel 440 with the second external electronic device 420. For example, the processor 120, based on a UI, may receive a user input for establishing the second communication channel 440 with the second external electronic device 420. The processor 120, based on user input, may establish the second communication channel 440. The processor 120 may automatically establish the second communication channel 440 in response to detecting that the second external electronic device 420 supports sniffing. For example, in response to detecting that the second external electronic device 420 has been previously connected to the electronic device 101 through the second communication channel 440, the processor 120 may automatically establish the second communication channel 440. For example, the processor 120 may receive a signal indicating a user input for establishing the second communication channel 440, which is input through the second external electronic device 420. Based on reception of a signal from the second external electronic device 420, the processor 120 may establish the second communication channel 440.

In step 808, the processor 120 may transmit communication parameters to the second external electronic device 420 through the second communication channel 440. The communication parameters may be used for the second external electronic device 420 to sniff the audio signal from the first communication channel 430.

Figure 9:
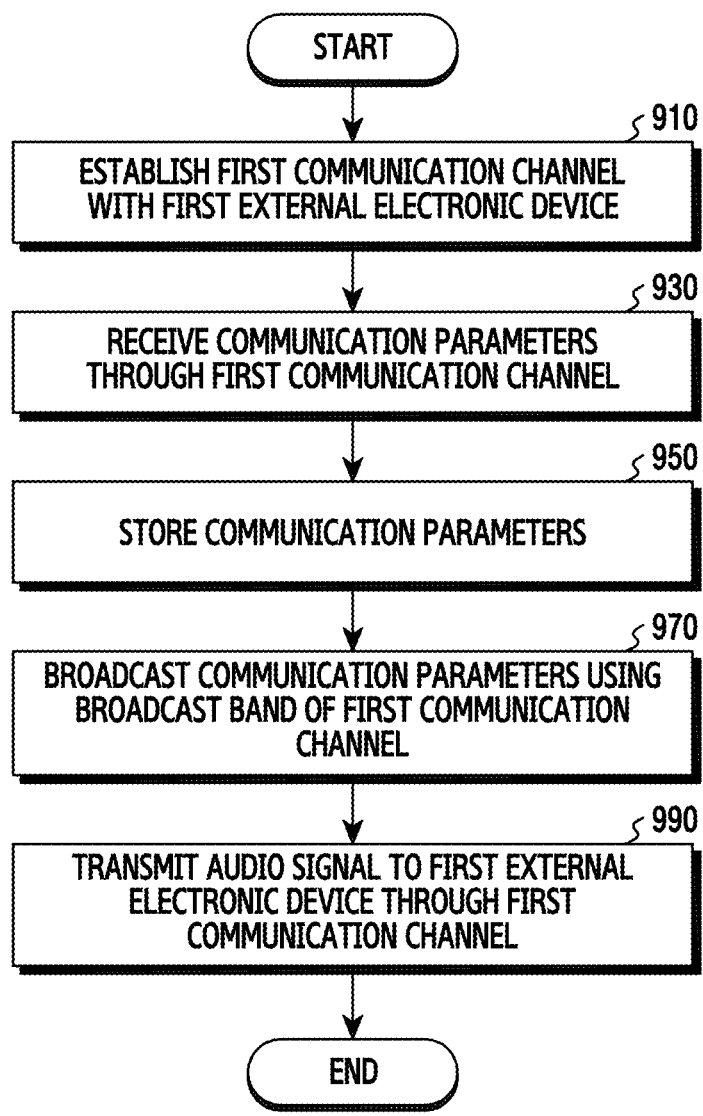
FIG. 9 is an operation of an electronic device according to an embodiment.

FIG. 9 is a flowchart of an operation of an electronic device according to an embodiment of the present disclosure. This operation may be performed by an electronic device 101 that includes audio sources. This operation enables the second external electronic device 420 to acquire communication parameters without using the second communication scheme. Since the second communication scheme is not used, the electronic device 101 may not include the second communication module 540 or the second signal management module 520.

Referring to FIG. 9, the processor 120 (or the first signal management module 510) may perform control such that the communication module 190 (or the first communication module 530) establishes a first communication channel 430 of the first communication scheme with the first external electronic device 410 in step 910.

In step 930, the processor 120 may perform control such that the communication module 190 receives communication parameters using the first communication channel 430. The first communication channel 430 may be used for the electronic device 101 to transmit an audio signal to the first external electronic device 410.

In step 950, the processor 120 may perform control such that the memory 130 stores the received communication parameters.

In step 970, the processor 120 may perform control such that the communication module 190 broadcasts the stored communication parameters. The processor 120 may broadcast the communication parameters through a certain band (e.g., a certain band of the first communication channel 430). The broadcast communication parameters may be received by one or more second external electronic devices 420. The received communication parameters may be used for one or more second external electronic devices 420 to acquire (or sniff) an audio signal from the first communication channel 430.

In step 990, the processor 120 may perform control such that the communication module 190 transmits an audio signal to the first external electronic device 410 through the first communication channel 430. The audio signal transmitted to the first external electronic device 410 may be acquired by the second external electronic devices 420 that have acquired the communication parameters.

Figure 10:
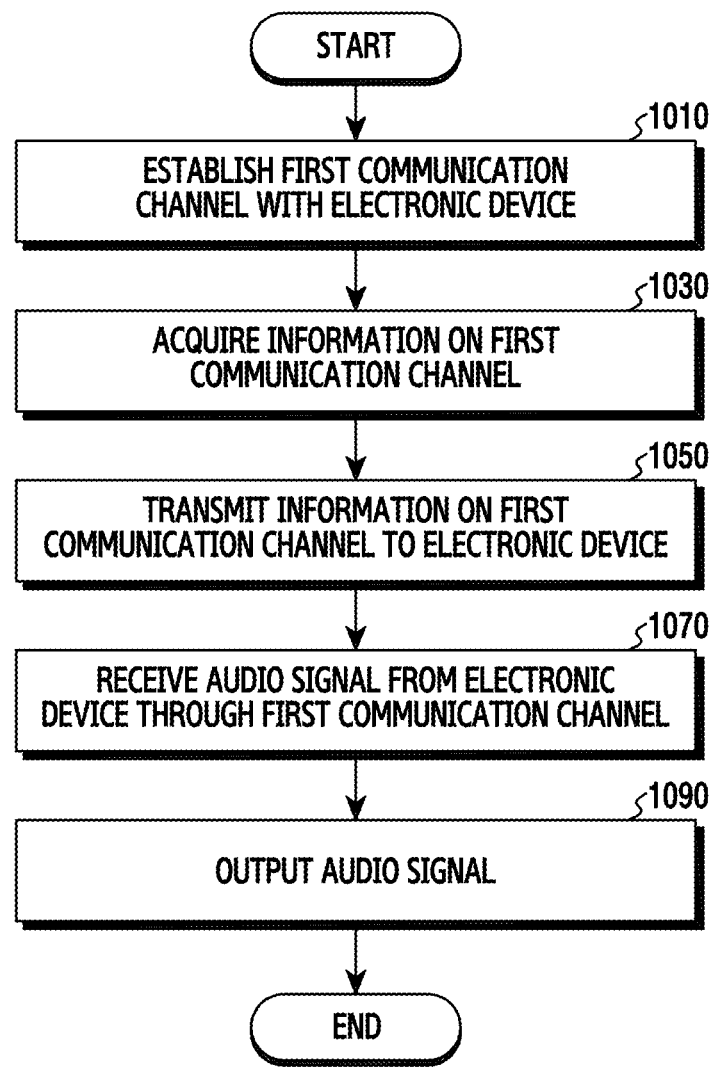
FIG. 10 is a flowchart of an operation of a first external electronic device according to an embodiment.

FIG. 10 is a flowchart of an operation of a first external electronic device according to an embodiment of the present disclosure. The first external electronic device may correspond to the first external electronic device 410 of FIG. 4.

Referring to FIG. 10, in step 1010, a first external electronic device 410 may establish a first communication channel 430 with an electronic device 101. In an embodiment, the first external electronic device 410 may broadcast identification information stating that it is available for a first communication connection. Based on the identification information, the first external electronic device 410, which is available for the first communication connection, may be displayed on a UI of the electronic device 101. The electronic device 101, based on a UI, may receive a user input for selecting the first external electronic device 410 for establishing the first communication channel 430. Based on the user input, the electronic device 101 may transmit a request for establishing the first communication channel 430 to the first external electronic device 410. Based on reception of the request from the electronic device 101, the first external electronic device 410 may establish the first communication channel 430 with the electronic device 101. In response to detecting that the first external electronic device 410 has been previously connected to the electronic device 101 through the first communication channel 430, the electronic device 101 may automatically establish the first communication channel 430.

In step 1030, the first external electronic device 410 may acquire communication parameters, which are channel information on the first communication channel 430. For example, based on the establishment of the first communication channel 430, the first external electronic device 410 may identify channel information on the first communication channel 430. In a case where the first communication channel 430 is BT standard communication, the first external electronic device 410 may identify BD_ADDR, LT_ADDR, a native clock of SRC, a clock offset between SRC and SNK, and an encryption parameter for a link between SRC and SNK from the first communication channel 430. The first external electronic device may acquire the identified communication parameters.

In step 1050, the first external electronic device 410 may transmit the acquired communication parameters to the electronic device 101. In an embodiment, the first external electronic device 410, as shown in FIG. 8, may transmit the communication parameter to the electronic device 101 through a second communication channel 440-0 (e.g., a BLE channel). The first external electronic device 410, as shown in FIG. 9, may transmit the communication parameters to the electronic device 101 through a first communication channel 430.

In step 1070, the first external electronic device 410 may receive an audio signal from the electronic device 101 through the first communication channel 430 (e.g., a BT pairing). In step 1090, the first external electronic device 410 may output the received audio signal.

Figure 11:
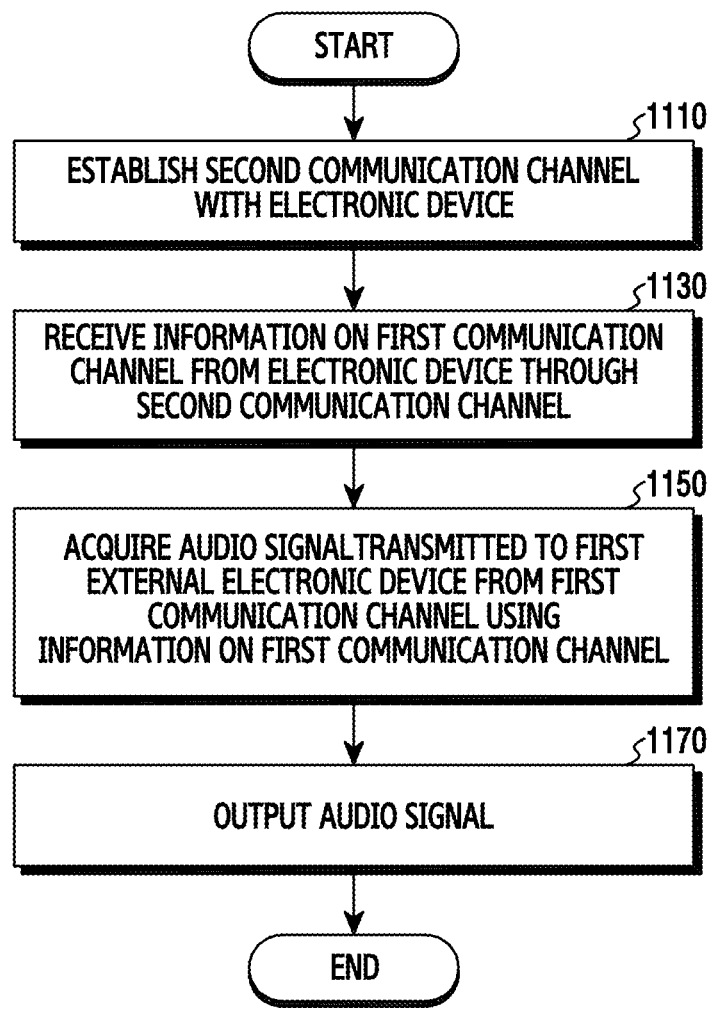
FIG. 11 is a flowchart of an operation of a second external electronic device according to an embodiment.

FIG. 11 is a flowchart of an operation of a second external electronic device according to an embodiment of the present disclosure. The second external electronic device may correspond to the second external electronic device 420 of FIG. 4.

Referring to FIG. 11, in step 1110, the second external electronic device 420 may establish a second communication channel 440 of the second communication scheme with the electronic device 101. In an embodiment, the second external electronic device 420 may broadcast identification information indicating that it is available for a second communication connection. Based on the identification information, the second external electronic device 420, which is available for the second communication connection, may be displayed on a UI of the electronic device 101. The electronic device 101, based on the UI, may receive a user input for selecting the second external electronic device 420 for establishing the second communication channel 440. Based on the user input, the electronic device 101 may transmit a request for establishing the second communication channel 440 to the second external electronic device 420. Based on reception of the request from the electronic device 101, the second external electronic device 420 may establish the second communication channel 440 with the electronic device 101. The electronic device 101 may automatically establish the second communication channel 440 in response to detection of the second external electronic device 420, based on the identification information. In response to detecting that the second external electronic device 420 has been previously connected to the electronic device 101 through the second communication channel 440, the electronic device 101 may automatically establish the second communication channel 440. The second external electronic device 420 may receive a user input for establishing the second communication channel 440. The second external electronic device 420, based on the received user input, may transmit a request for establishing the second communication channel 440 to the electronic device 101. Based on reception of the request from the second external electronic device 420, the electronic device 101 may establish the second communication channel 440 with the second external electronic device 420.

In step 1130, the second external electronic device 420 may receive communication parameters from the electronic device 101 through the established second communication channel 440. However, the acquisition of the communication parameters is not limited thereto, and the second external electronic device 420 may acquire the communication parameters in any way. For example, the second external electronic devices 420, as shown in FIG. 9, may receive communication parameters broadcast from the electronic device 101 through a certain band (e.g., a certain band of the first communication channel 430).

The second external electronic device 420 may receive, based on a user input through the second external electronic device 420, communication parameters, may receive, based on a user input through the electronic device 101, communication parameters, or may receive communication parameters in response to the establishment of the second communication channel 440.

In step 1150, the second external electronic device 420 may acquire (or sniff) an audio signal from the first communication channel 430 using the received communication parameters. The audio signal may be transmitted from the electronic device 101 to the first external electronic device 410. In step 1170, the second external electronic device 420 may output the acquired audio signal.

Figure 12:
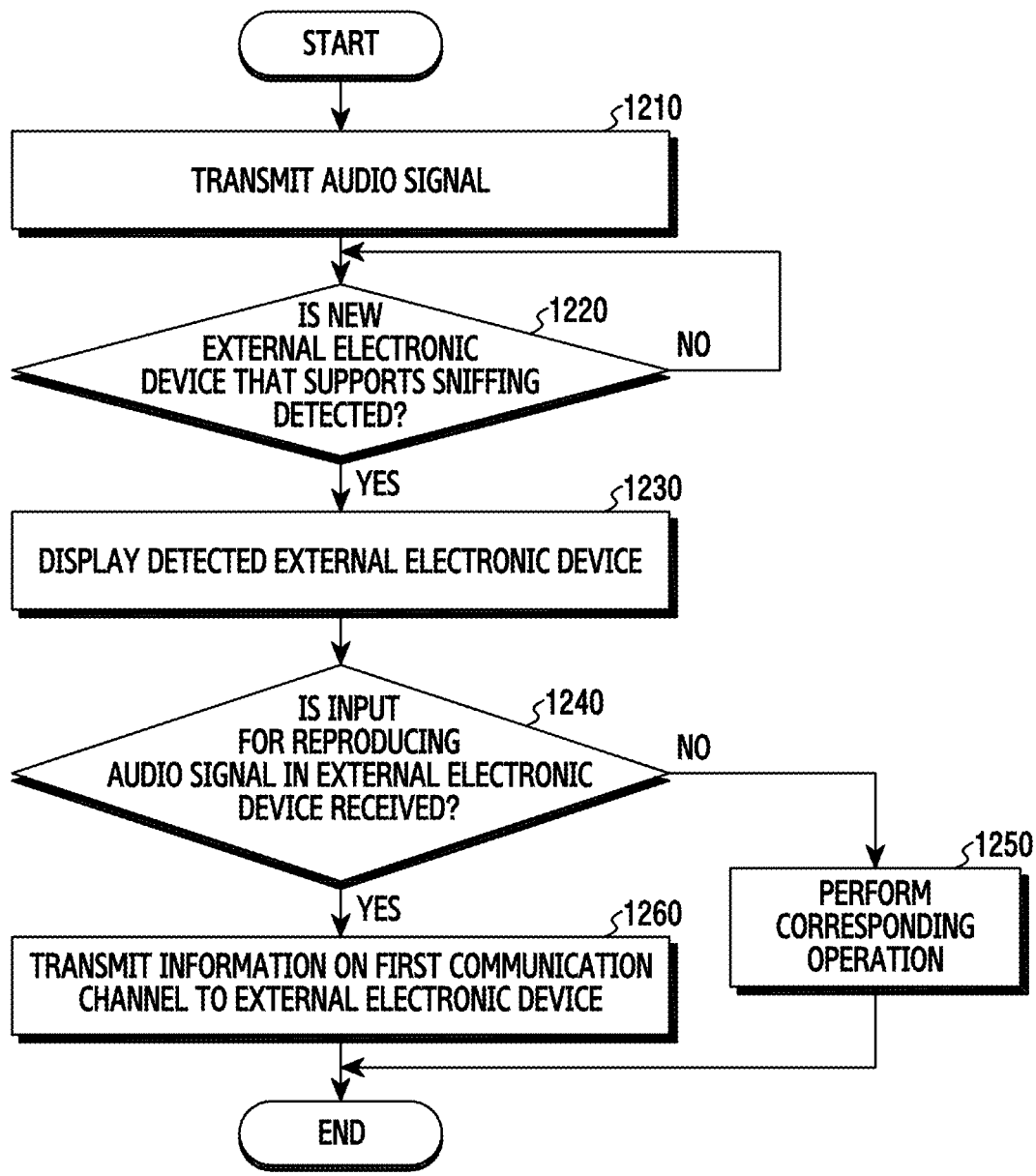
FIG. 12 is a flowchart of an operation of an electronic device for adding a new external electronic device according to an embodiment.

FIG. 12 is a flowchart of an operation of an electronic device for adding a new external electronic device according to various embodiments. This operation may be performed by an electronic device 101 including audio sources. The newly added external electronic device may correspond to the second external electronic device 420 of FIG. 4.

Referring to FIG. 12, in step 1210, the processor 120 may transmit an audio signal to the first external electronic device 410. The electronic device 101 may be in the state of being connected with the first external electronic device 410 through the first communication channel 430.

In step 1220, the processor 120 may detect the presence of a new external electronic device that supports sniffing.

For example, a new external electronic device that supports sniffing may refer to an external electronic device that is able to acquire communication parameters and is able to acquire an audio signal from a communication channel related to the communication parameters using the acquired communication parameters.

The processor 120 may detect the new external electronic device by receiving identification information from the new external electronic device. The identification information may indicate that the new external electronic device supports sniffing. The identification information may be broadcast through the second communication scheme by the new external electronic device. The processor 120 may identify the new external electronic device that supports sniffing using the identification information. The processor 120 may continue to perform step 1220 while the electronic device 101 transmits an audio signal by means of the first communication scheme.

In step 1230, the processor 120, based on detection of a new external electronic device, may display the new external electronic device on a UI. The new detected external electronic device may transmit a request for establishing a channel of the second communication scheme to the processor 120.

In step 1240, the processor 120 may receive an input for accepting the request received from the new external electronic device. The input for accepting the request may refer to an input for outputting an audio signal from the new external electronic device. Based on the received input, the processor 120 may establish the second communication channel 440 between the electronic device 101 and the new external electronic device.

In step 1250, based on the fact that an input for accepting the request has not been received, the processor 120 may perform a corresponding operation. For example, the processor 120 may wait for a predetermined period of time. For example, the processor 120 may provide an alarm (e.g., a vibration) indicating that a request has been received from the new external electronic device. For example, the processor 120 may automatically establish the second communication channel 440 in response to detecting that the new electronic device has been previously connected to the electronic device 101 through the channel of the second communication scheme.

In step 1260, based on the establishment of the second communication channel 440, the processor 120 may transmit communication parameters to the new external electronic device through the second communication channel 440. The new external electronic device may sniff an audio signal from the first communication channel 430 using the received communication parameters.

Figure 13:
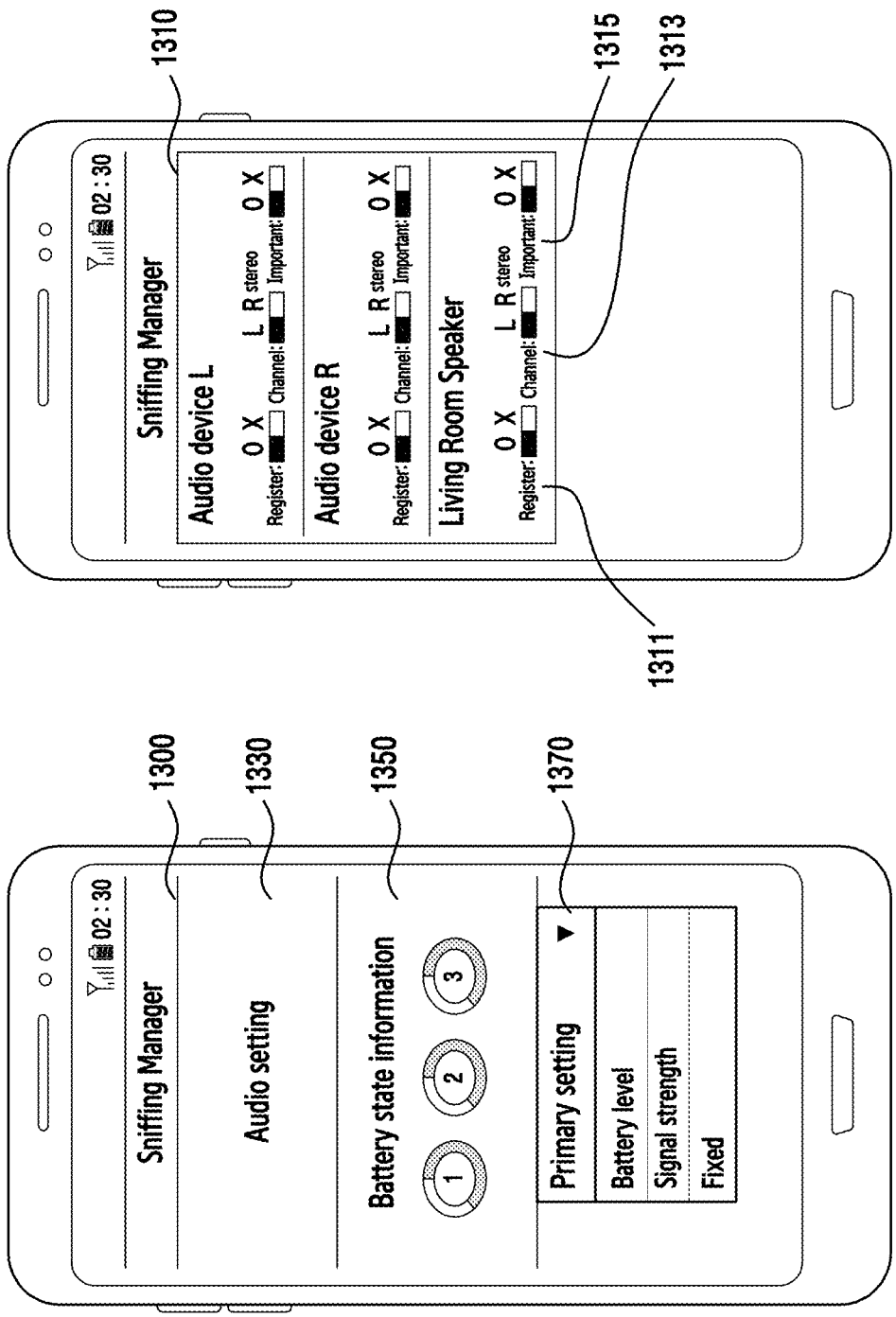
FIG. 13 is an illustration of a UI of an electronic device for managing external electronic devices according to an embodiment.

FIG. 13 is an illustration of a UI of an electronic device for managing external electronic devices according to an embodiment of the present disclosure. The UI may be a UI of an application or software for managing the sniffing of one or more external electronic devices.

A UI 1300 may include at least one of an object 1330 for setting information on the external electronic device, an object 1350 for displaying the remaining amount of battery power of the external electronic device, and an object 1370 for setting a criterion for determining the first external electronic device.

Based on reception of an input for selecting the object 1330, a UI 1310 may be displayed. The UI 1310 may include a list of external electronic devices detected by the electronic device 101. The list may show external electronic devices that support sniffing. For example, the list of the detected external electronic devices may include an audio device L (left), an audio device R (right), a living-room speaker, and the like. The UI 1310 may include additional information on the respective external electronic devices. The additional information may include an object 1311 for indicating whether or not each external electronic device is in a connection state, an object 1313 for indicating audio channel information of each external electronic device, and an object 1315 for indicating whether or not each external electronic device is an external important electronic device.

The object 1311 may display whether or not each of the external electronic devices is in the connected state with the electronic device 101. The connected state may indicate the state in which the respective external electronic devices are connected to the electronic device 101 through the second communication channels (e.g., the second communication channels 440-0 and 440-1).

In an embodiment, the processor 120 may automatically establish the second communication channel in response to detecting that an external electronic device, which has been previously connected to the electronic device 101 by means of the second communication scheme, exists in the wireless environment 400. The processor 120 may display "O" on the object 1311 for the external electronic device with which the second communication channel has been established. For example, when a second communication channel 440-0 is established with the audio device L (e.g., the first external electronic device 410), the processor 120 may display "O" on the object 1311 corresponding to the audio device L. The processor 120 may display "X" on the object 1311 in response to detecting that an external electronic device, which has been previously connected to the electronic device 101 by means of the second communication scheme, is not present in the wireless environment 400. For example, when the processor 120 has failed to establish a second communication channel 440-N with a second external electronic device 420-N, the processor 120 may display "X" on the object 1311 corresponding to the second external electronic device 420-N. The processor 120 may display a UI or an object indicating a new external electronic device in response to detection of a new external electronic device that has never previously been connected to the electronic device 101 by means of the second communication scheme.

In an embodiment, a user may establish a connection between the external electronic device and the electronic device 101 using the object 1311. For example, based on reception of an input for selecting "O" on the object 1311, the processor 120 may establish the second communication connection 440 with the corresponding external electronic device. The processor 120 may transmit communication parameters to the external electronic device with which the second communication connection 440 has been established.

The object 1313 may display audio channel information to be output from the respective external electronic devices. The audio channel may include an R (right)-channel, an L (left)-channel, or a stereo (right and left) channel. The audio channel may be based on the characteristics of the external electronic device.

In an embodiment, the respective external electronic devices may store audio information to be output therefrom. For example, the external electronic device may store information indicating that the audio device L outputs an L-channel, the audio device R outputs an R-channel, and the living-room speaker outputs a stereo channel. The respective external electronic devices may transmit the stored audio channel information to the electronic device 101 through the second communication channels 440. The processor 120 may display the received audio channel information by means of the object 1313.

In an embodiment, a user may set the audio channel information for the respective external electronic devices. The processor 120, based on user input, may receive an input for setting an audio channel to be output from the respective external electronic devices through the object 1313. For example, the user may make a setting such that the L-channel is output from the audio device L, the R-channel is output from the audio device R, and the stereo channel is output from the living-room speaker. In an embodiment, an external electronic device (e.g., the living-room speaker), which supports stereo, may be configured to output one of the stereo channel, the L-channel, or the R-channel depending on a user's selection.

The processor 120 may transmit the set audio channel information to the respective external electronic devices (e.g., the audio device L, the audio device R, and the living-room speaker) through the second communication channels 440. The respective external electronic devices may store (or may temporarily store) the received audio channel information.

The audio device L may mute the R-channel of an audio packet received from the electronic device 101 to thus output only the L-channel. For example, in the case where the audio device L is set as the first external electronic device 410, an audio packet may be received from the electronic device 101 through the first communication channel 430 (e.g., a BT pairing). The audio device R may mute the L-channel of the audio packet acquired from the electronic device 101 to thus output only the R-channel. For example, in the case where the audio device R is set as the second external electronic device 420-1, an audio packet may be sniffed from the first communication channel 430. The living-room speaker may output both the L-channel and the R-channel of the audio packet acquired from the electronic device 101.

The respective external electronic devices may be set as external important electronic devices by means of the object 1315. For example, if the first external electronic device 410 is a left earphone and the second external electronic device 420-1 is a right earphone, since synchronization between the two earphones is important, the user may set the left and right earphones as external important electronic devices.

The electronic device 101 may receive an input for selecting the external important electronic device through the object 1315. The electronic device 101 may transmit, to an external electronic device set as an external important electronic device, information stating that it has been set as an external important electronic device through the second communication channel. For example, if the audio device L is selected (or set) as an external important electronic device, the electronic device 101 may transmit, to the audio device L, information stating that the audio device L has been set as an external important electronic device through the second communication channel. For example, in the case where the audio device R is selected (or set) as an external important electronic device, the electronic device 101 may transmit, to the audio device R, information stating that the audio device R has been set as an external important electronic device through the second communication channel 440.

The external electronic devices (e.g., the audio device L and the audio device R), which have been set as external important electronic devices, may transmit, to the device 101, a response (e.g., an ACK or a NACK) indicating whether or not an audio packet has been successfully received. The operation of the external important electronic device is described below in greater detail with reference to FIG. 14.

The electronic device 101 may display an object 1350 for displaying the remaining amount of battery power of the external electronic device through the UI 1300. The object 1350 may display the remaining amounts of battery power of one or more external electronic devices. The one or more external electronic devices may be external electronic devices that are acquiring and outputting audio signals. Information on the remaining amount of battery power may be received, periodically or by request of the electronic device 101, from the one or more external electronic devices through the second communication channel 440.

In an embodiment, information on the remaining amount of battery power of the first external electronic device 410 may be used as one of the events that cause a change in the first external electronic device. For example, if the remaining amount of battery power of the original first external electronic device 410 is less than a reference amount of battery power, the first external electronic device may be changed. For example, if the remaining amount of battery power of the second external electronic device 420-1 is greater than the remaining amount of battery power of the original first external electronic device 410, the second external electronic device 420-1 may be set as a new first external electronic device.

In an embodiment, information on the remaining amounts of battery power of one or more second external electronic devices may be used as a criterion for determining a new first external electronic device. For example, when an event, which causes a change in the first external electronic device, is detected, the second external electronic device having the maximum remaining amount of battery power, among one or more second external electronic devices, may be determined as a new first external electronic device.

The electronic device 101 may display an object 1370 for setting a criterion for determining the first external electronic device on the UI 1300. Based on detection of an event that causes a change in the first external electronic device, the processor 120 may determine a new first external electronic device. For example, the criterion for determining a new first external electronic device may be configured as the remaining amounts of battery power of the external electronic devices, signal strengths of the communication channels of the external electronic devices (e.g., the first communication channel 430 and the second communication channel 440), or "fixed."

In an embodiment, the processor 120 may receive a user input for selecting a "battery level" in the object 1370. When the battery level is selected, based on detection of an event that causes a change in the first external electronic device, the electronic device 101 may determine that the second external electronic device, having the maximum remaining amount of battery power, is a new first external electronic device.

In an embodiment, the processor 120 may receive a user input for selecting "signal strength" in the object 1370. When signal strength is selected, based on detection of an event that causes a change in the first external electronic device, the electronic device 101 may determine the second external electronic device having the maximum signal strength to be a new first external electronic device. For example, the signal strength of the first external electronic device 410 may be at least one of the signal strength of the first communication channel 430 or the signal strength of the second communication channel 440-0. The signal strength of the second external electronic device 420 may be the signal strength of the second communication channel 440. In a case where the external electronic device is an external important electronic device, the signal strength may be determined based on at least one of the number of ACKs transmitted from the external important electronic device or a response time of an ACK transmitted from the external important electronic device. For example, if a large number of ACKs is transmitted from the external important electronic device (e.g., the second external electronic device 420-1), the processor 120 may determine that the external important electronic device has a high signal strength. If a response time of ACK transmitted from the external important electronic device is short, the processor 120 may determine that the external important electronic device has a high signal strength.

In an embodiment, the processor 120 may receive a user input for selecting "fixed" in the object 1370. When fixed is selected, the electronic device 101 may not determine a new first external electronic device even if the electronic device 101 detects an event that causes a change in the first external electronic device. That is, the first external electronic device may be fixed.

Figure 14:
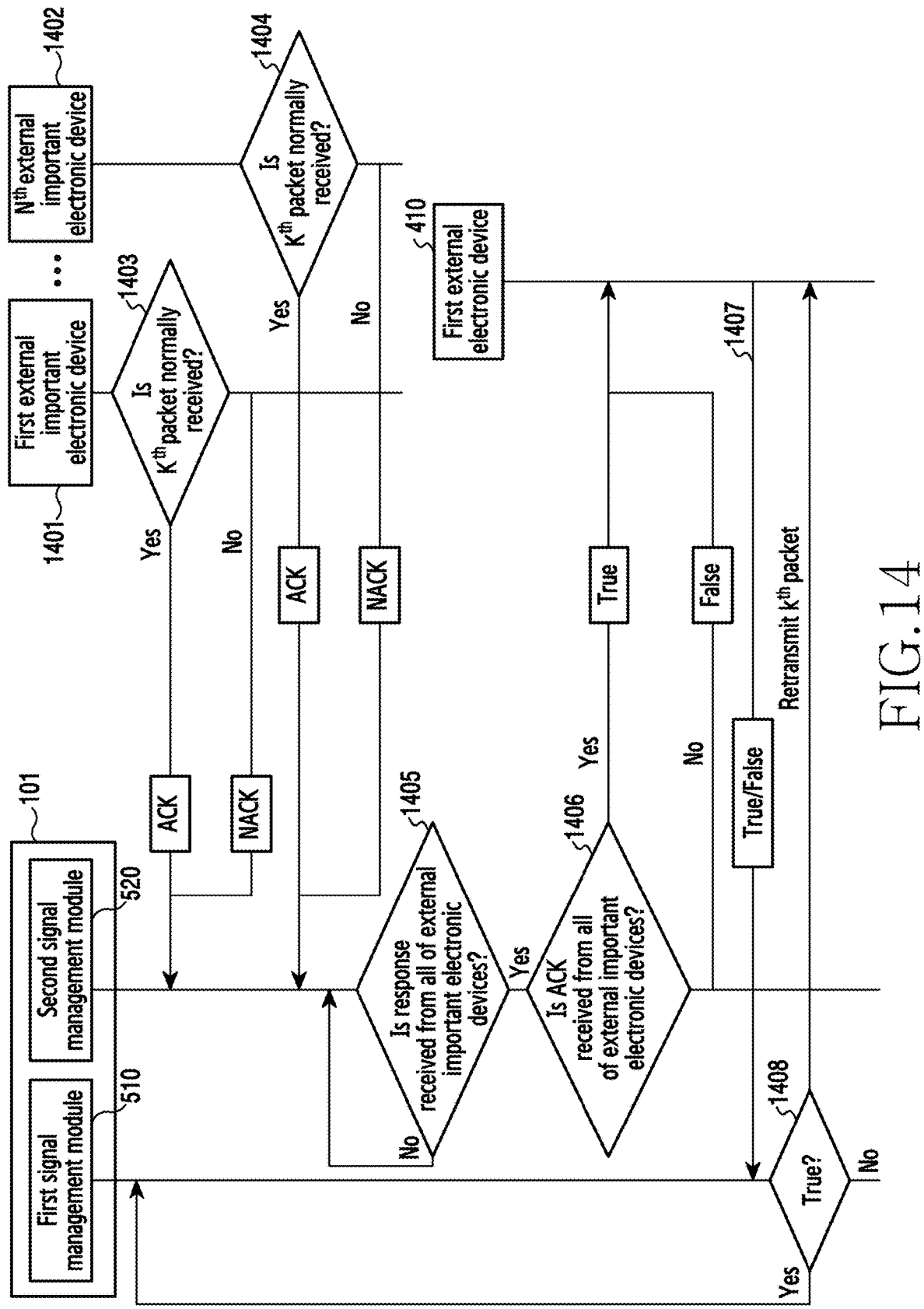
FIG. 14 is a signal flow diagram related to responses of external important electronic devices according to various embodiments.

FIG. 14 is a signal flow diagram related to responses of external important electronic devices according to an embodiment of the present disclosure.

Referring to FIG. 14, a first external important electronic device 1401 to an $N^{th}$ external important electronic device 1402 may be some of one or more external electronic devices (e.g., the first external electronic device 410 and the second external electronic device 420). The first external important electronic device 1401 to the $N^{th}$ external important electronic device 1402 may be referred to as external important electronic devices. For example, the first external electronic device 410 may also be the external important electronic device. The second external electronic device 420 may also be the external important electronic device.

The external important electronic device may detect a loss of audio packets, and may feed the loss back to the electronic device 101. The external important electronic device may transmit, to the electronic device 101, a response (ACK/NACK) indicating whether or not an audio packet has been successfully received through the second communication channel.

In step 1403, the first external important electronic device 1401 may determine whether or not a $k^{th}$ (where k is a natural number) audio packet has been normally received. Based on detecting that the $k^{th}$ audio packet has been normally received, the first external important electronic device 1401 may transmit an ACK to the second signal management module 520 of the electronic device 101. Based on detecting that the $k^{th}$ audio packet has not been normally received, the first external important electronic device 1401 may transmit a NACK to the second signal management module 520 of the electronic device 101. The ACK or the NACK may be transmitted through the second communication channel.

In step 1404, the $N^{th}$ external important electronic device 1402 may determine whether or not the $k^{th}$ audio packet has been normally received. Based on detecting that the $k^{th}$ audio packet has been normally received, the $N^{th}$ external important electronic device 1402 may transmit an ACK to the second signal management module 520 of the electronic device 101. Based on detecting that the $k^{th}$ audio packet has not been normally received, the $N^{th}$ external important electronic device 1402 may transmit a NACK to the second signal management module 520 of the electronic device 101. The ACK or the NACK may be transmitted through the second communication channel.

The second signal management module 520 of the electronic device 101 may receive the ACK/NACK for the $k^{th}$ audio packet from the external important electronic devices, and may temporarily store the same.

In step 1405, the second signal management module 520 may determine whether or not responses (ACK or NACK) have been received from all of the external important electronic devices. For example, the second signal management module 520, based on set information (e.g., the object 1315), may identify external important electronic devices among one or more second external electronic devices. The second signal management module may check whether or not an ACK or a NACK has been received from the identified external important electronic device. The second signal management module 520 may determine whether or not responses (ACK or NACK) have been received from all of the external important electronic devices for a designated time.

In step 1406, in response to reception of ACKs from all of the external important electronic devices, the second signal management module 520 may transmit TRUE to the first external electronic device 410. The second signal management module 520 may transmit FALSE to the first external electronic device 410 in response to reception of at least one NACK. If no ACK or NACK has been received from at least one external important electronic device during a designated time, the second signal management module 520 may transmit FALSE to the first external electronic device 410 when the designated time elapses. TRUE or FALSE may be transmitted through the second communication channel 440-0 (e.g., a BLE non-standard communication channel).

In step 1407, the first external electronic device 410 may transmit TRUE/FALSE received from the second signal management module 520 to the first signal management module 510. Based on the transmission of TRUE from the second signal management module 520, the first external electronic device 410 may transmit TRUE to the first signal management module 510. Based on the transmission of FALSE from the second signal management module 520, the first external electronic device 410 may transmit FALSE to the first signal management module 510. TRUE or FALSE may be transmitted through the first communication channel 430 (e.g., a BT standard communication channel).

In step 1408, the first signal management module 510 of the electronic device 101, based on the reception of TRUE from the first external electronic device 410, may determine that all of the external important electronic devices have successfully received the audio packet. When receiving TRUE from the first external electronic device 410, the first signal management module 510 may not retransmit the $k^{th}$ audio packet to the first external electronic device 410. When a designated time elapses from the time of transmitting the $k^{th}$ audio packet, the first signal management module 510 may transmit the $(k+1)^{th}$ audio packet to the first external electronic device 410. The external important electronic devices may transmit an ACK/NACK for the $(k+1)^{th}$ audio packet to the second signal management module 520.

Based on the reception of FALSE from the first external electronic device 410, the first signal management module 510 may retransmit the $k^{th}$ audio packet to the first external electronic device 410. The reception of FALSE by the first signal management module 510 may indicate that at least one external important electronic device has failed to normally receive the $k^{th}$ audio packet. If neither TRUE nor FALSE is received from the first external electronic device, the first signal management module 510 may retransmit the $k^{th}$ audio packet to the first external electronic device 410 when a designated time elapses. The external important electronic devices may acquire the retransmitted audio packet. By acquiring the retransmitted audio packet, the audio packet may be prevented from being lost in the external important electronic devices.

Figure 15:
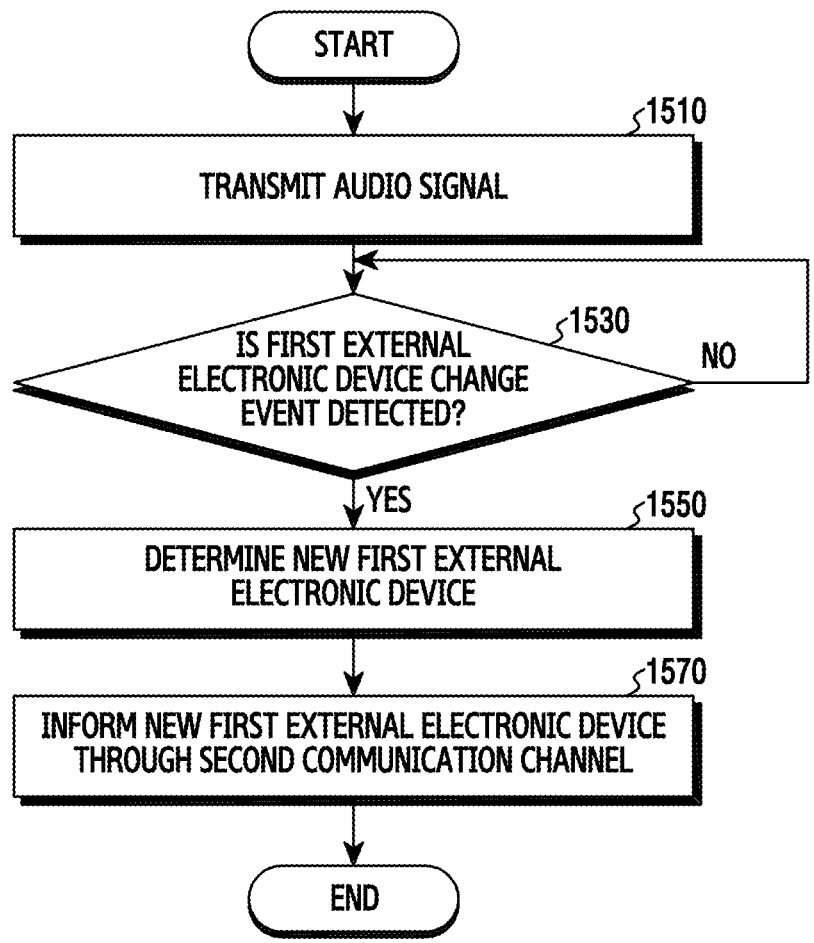
FIG. 15 is a flowchart of an operation of an electronic device for changing a first external electronic device according to an embodiment.

FIG. 15 is a flowchart of an operation of an electronic device for changing a first external electronic device according to an embodiment of the present disclosure. This operation may be performed by an electronic device 101 including audio sources.

Referring to FIG. 15, in step 1510, the processor 120 may transmit an audio signal to the first external electronic device 410. The processor 120 may transmit an audio signal to the first external electronic device 410 through the first communication channel 430.

In step 1530, the processor 120 may detect an event that causes a change in the first external electronic device 410.

In an embodiment, the event may be related to at least one of a user input, a remaining amount of battery power of the first external electronic device 410, or a signal strength of the first external electronic device (e.g., the signal strength of the first communication channel 430 and the signal strength of the second communication channel 440-0). For example, based on reception of an user input for changing the first external electronic device, the processor 120 may change the first external electronic device. For example, based on detecting that the remaining amount of battery power of the original first external electronic device 410 is less than a reference amount of battery power, the processor 120 may change the first external electronic device. For example, based on detecting that the signal strength of the first communication channel 430 of the original first external electronic device 410 is less than a reference strength, the processor 120 may change the first external electronic device.

In an embodiment, the event may include disconnection of the first communication channel 430 or loss of the first communication channel 430. For example, if the first communication channel 430 is disconnected or lost while transmitting an audio packet to the first external electronic device 410 through the first communication channel 430, the processor 120 may change the first external electronic device.

In step 1550, based on detection of an event that causes a change in the first external electronic device 410, the processor 120 may determine a new first external electronic device. A criterion for determining a new first external electronic device may be set based on the object 1370 by a user. For example, based on at least one of the remaining amounts of battery power of the second external electronic devices 420 or signal strengths of the second communication channels 440 of the second external electronic devices 420, the processor 120 may determine a new first external electronic device. In a case where the second external electronic device 420 is an external important electronic device, the signal strength of the second communication channel 440 may be determined based on at least one of the number of ACKs transmitted from the second external electronic devices 420 or a response time of the ACK transmitted from the second external electronic device 420.

In step 1570, the processor 120 may transmit, to a new first external electronic device (e.g., the second external electronic device 420-1), information stating that the new first external electronic device has been set as a new first external electronic device through the second communication channel (e.g., the second communication channel 440-1). The new first external electronic device may perform the operation of the original first external electronic device using pre-acquired communication parameters. For example, the role of the second external electronic device 420-1, which receives information stating that the new first external electronic device has been set as a new first external electronic device from the electronic device 101, may be virtually converted to the role of the original first external electronic device 410. The new first external electronic device may not be in the actual pairing state with the electronic device 101. The new first external electronic device may not be in the actual pairing state with the electronic device 101.

Figure 16:
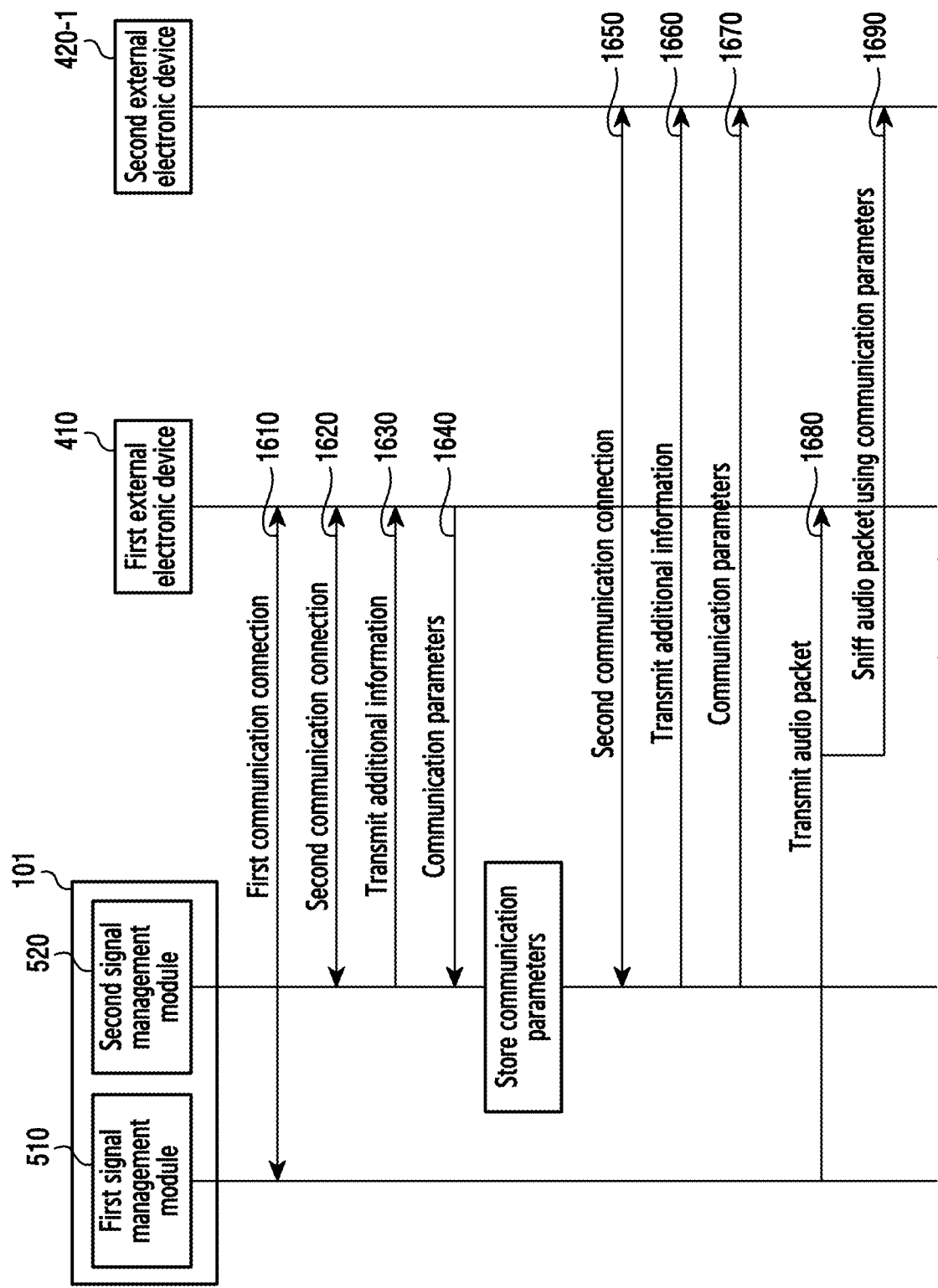
FIG. 16 is a signal flow diagram of an electronic device and external electronic devices according to an embodiment.

FIG. 16 is a signal flow diagram of an electronic device and external electronic devices according to an embodiment of the present disclosure.

Referring to FIG. 16, in step 1610, the first signal management module 510 of the electronic device 101 may establish a first communication connection (e.g., a BT pairing) with the first external electronic device 410. The first communication connection may be the first communication channel 430. The processor 120, based on user input, may determine the first external electronic device 410.

In step 1620, the second signal management module 520 of the electronic device 101 may establish a second communication connection (e.g., a BLE channel) with the first external electronic device 410. The second communication connection may be the second communication channel 440-0. Based on detecting that the first external electronic device 410 supports sniffing, the processor 120 may establish the second communication connection.

In step 1630, the second signal management module 520 of the electronic device 101 may transmit additional information on the first external electronic device 410 to the first external electronic device 410. The additional information may include audio channel information (e.g., an L-channel, an R-channel, or a stereo channel) to be output from the first external electronic device 410 or information on whether or not the first external electronic device 410 has been set as an external important electronic device. The processor 120, based on the UI 1310, may set additional information on the first external electronic device 410. The additional information may be transmitted through the second communication channel 440-0.

In step 1640, the second signal management module 520 of the electronic device 101 may receive channel information (e.g., communication parameters) on the first communication channel 430 from the first external electronic device 410. The communication parameters may be received through the second communication channel 440-0. The sequence of step 1630 and step 1640 may vary. The signal management module 520 of the electronic device 101 may store the received communication parameters.

In step 1650, the second signal management module 520 of the electronic device 101 may establish a second communication connection with the second external electronic device 420-1. The connection may be the second communication channel 440-1. For example, based on detection of the second external electronic device 420-1 that supports sniffing, the processor 120 may establish the second communication connection. The processor 120, based on the UI 1310, may display the second external electronic device 420-1 connected to the second communication. For example, the processor 120, based on user input, may determine the second external electronic device 420-1 to be connected to the second communication.

In step 1660, the second signal management module 520 of the electronic device 101 may transmit additional information on the second external electronic device 420-1 to the second external electronic device 420-1. The additional information may include audio channel information (e.g., an L-channel, an R-channel, or a stereo channel) to be output from the second external electronic device 420-1 or information on whether or not the second external electronic device 420-1 has been set as an external important electronic device. The processor 120, based on the UI 1310, may set additional information on the second external electronic device 420-1. The additional information may be transmitted through the second communication channel 440-1.

In step 1670, the second signal management module 520 of the electronic device 101 may transmit communication parameters to the second external electronic device 420-1. The communication parameters may be transmitted through the second communication channel 440-1. The communication parameters may be used for sniffing of the second external electronic device 420-1. The sequence of step 1660 and step 1670 may vary.

In step 1680, the first signal management module 510 of the electronic device 101 may transmit an audio packet to the first external electronic device 410 through the first communication channel 430. The first external electronic device 410 may output an audio signal corresponding to the audio packet. Step 1680 may be performed based on step 1610 (e.g., a BT pairing). Step 1680 may continue to be performed after step 1610 is performed.

In step 1690, the second external electronic device 420-1 may sniff the first communication channel 430 using the communication parameters. The second external electronic device 420-1 may sniff an audio packet from the first communication channel 430. The second external electronic device 420-1 may sniff an audio packet that the electronic device 101 transmits to the first external electronic device 410 through the first communication channel 430. The second external electronic device 420-1 may output an audio signal corresponding to the audio packet. The second external electronic device 420-1 may output the same signal as the audio signal output by the first external electronic device 410 at the same time. The operation of the second external electronic device 420-1 may also be performed by the second external electronic device 420-2 or the second external electronic device 420-N in the same manner.

Methods according to the present disclosure may be implemented in hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to the present disclosure as defined by the appended claims and their equivalents.

The programs (software modules or software) may be stored in non-volatile memories including a random access memory and a flash memory, a read only memory (ROM), an electrically erasable programmable ROM (EEPROM), a magnetic disc storage device, a compact disc ROM (CD-ROM), digital versatile discs (DVDs), or other types of optical storage devices, or a magnetic cassette. Alternatively, any combination of some or all of the devices described above may form a memory in which a program is stored. Further, a plurality of such memories may be included in the electronic device.

In addition, the programs may be stored in an attachable storage device which may access the electronic device through communication networks such as the Internet, Intranet, local area network (LAN), wide area LAN (WLAN), storage area network (SAN), and a combination thereof. Such a storage device may access the electronic device via an external port. Further, a separate storage device on the communication network may access a portable electronic device.

In the above-described detailed embodiments, a component included in the present disclosure is expressed in the singular or the plural according to a presented detailed embodiment. However, the singular form or plural form is selected for convenience of description suitable for the presented situation, and various embodiments of the present disclosure are not intended to be limited to a single element or multiple elements thereof. Further, either multiple elements expressed in the above description may be configured into a single element or a single element in the above description may be configured into multiple elements.

While the present disclosure has been shown and described with reference to certain embodiments thereof, it will be understood by those skilled in the art that various changes in form and details may be made therein without departing from the scope and spirit of the present disclosure. Therefore, the scope of the present disclosure is not defined as being limited to the embodiments, but is defined by the appended claims and equivalents thereof.

What is claimed is:

1. An electronic device, comprising:
  a communication circuit configured to support communications by a first communication scheme and a second communication scheme; and
  a processor,
  wherein the processor is configured to:
    establish a first communication channel corresponding to the first communication scheme with a first external electronic device using the communication circuit;
    receive, from the first external electronic device, configuration information related to the first communication channel;
    transmit, to the first external electronic device, audio data through the first communication channel such that the first external electronic device outputs the audio data; and
    transmit, to a second external electronic device, the configuration information related to the first communication channel through the second communication channel corresponding to the second communication scheme such that the second external electronic device is capable of acquiring the audio data using the configuration information,
  wherein the configuration information comprises channel information for the first communication channel between the electronic device and the first external electronic device.

2. The electronic device of claim 1, wherein the second external electronic device comprises a plurality of external electronic devices, and
  wherein the processor is further configured to:
    establish a plurality of channels corresponding to the second communication scheme with the plurality of external electronic devices; and receive information related to an acknowledgement (ACK) and a negative acknowledgement (NACK) for some of the audio data from a designated external electronic device, among the plurality of external electronic devices.

3. The electronic device of claim 2, wherein the processor is further configured to, when detecting that a signal strength of the first communication channel is less than a reference strength, based on at least signal strengths of the plurality of channels, determine an external electronic device for transmitting the audio data using the first communication channel, among the plurality of external electronic devices.

4. The electronic device of claim 1, wherein the processor is further configured to establish a third communication channel corresponding to the second communication scheme with the first external electronic device.

5. The electronic device of claim 4, wherein the configuration information comprises information for the second external electronic device to access the first communication channel, and wherein the processor is further configured to receive the configuration information from the first external electronic device through the third communication channel.

6. The electronic device of claim 1, wherein the processor is further configured to transmit additional information on the second external electronic device to the second external electronic device through the second communication channel, and wherein the additional information comprises information related to an audio channel to be output through the second external electronic device, among the audio data.

7. The electronic device of claim 1, further comprising a display, wherein the processor is further configured to:
display a graphic object corresponding to the second external electronic device through the display; and
based on at least an input for selecting the graphic object, transmit the configuration information to the second external electronic device.

8. The electronic device of claim 1, wherein the processor is further configured to:
receive information related to remaining amounts of battery power of a plurality of external electronic devices from the plurality of external electronic devices; and
when detecting that a remaining amount of battery power of the first external electronic device is less than a reference amount of battery power, based on the remaining amounts of battery power of the plurality of external electronic devices, determine an external electronic device for transmitting the audio data using the first communication channel, among the plurality of external electronic devices.

9. The electronic device of claim 1, wherein the processor is further configured to receive the configuration information from the first external electronic device using the first communication channel.

10. The electronic device of claim 1, wherein the processor is further configured to broadcast the configuration information using a broadcast band of the first communication channel, and wherein the configuration information comprises at least one of device address information, logical transport address information, clock information of the electronic device, clock offset between the electronic device and the first external device, or an encryption parameter for a link between the electronic device and the first external device.

11. A method of an electronic device, the method comprising:
establishing a first communication channel corresponding to a first communication scheme with a first external electronic device;
receiving, from the first external electronic device, configuration information related to the first communication channel;
transmitting, to the first external electronic device, audio data through the first communication channel such that the first external electronic device outputs the audio data; and
transmitting, to a second external electronic device, the configuration information related to the first communication channel through a second communication channel corresponding to a second communication scheme such that the second external electronic device is capable of acquiring the audio data using the configuration information,
wherein the configuration information comprises channel information for the first communication channel between the electronic device and the first external electronic device.

12. The method of claim 11, wherein the second external electronic device comprises a plurality of external electronic devices, and
wherein the method further comprises:
establishing a plurality of channels corresponding to the second communication scheme with the plurality of external electronic devices; and
receiving information related to an acknowledgement (ACK) and a negative acknowledgement (NACK) for some of the audio data from a designated external electronic device, among the plurality of external electronic devices.

13. The method of claim 12, further comprising, when detecting that a signal strength of the first communication channel is less than a reference strength, based on at least signal strengths of the plurality of channels, determining an external electronic device for transmitting the audio data using the first communication channel, among the plurality of external electronic devices.

14. The method of claim 11, further comprising establishing a third communication channel corresponding to the second communication scheme with the first external electronic device.

15. The method of claim 14, wherein the configuration information comprises information for the second external electronic device to access the first communication channel, and
wherein receiving the configuration information comprises receiving the configuration information from the first external electronic device through the third communication channel.

16. The method of claim 11, further comprising transmitting additional information on the second external electronic device to the second external electronic device through the second communication channel, wherein the additional information comprises information related to an audio channel to be output through the second external electronic device, among the audio data.

17. The method of claim 11, wherein transmitting the configuration information to the second external electronic device comprises:
displaying a graphic object corresponding to the second external electronic device; and based on at least an input for selecting the graphic object, transmitting the configuration information to the second external electronic device.

18. The method of claim 11, further comprising:
receiving information related to remaining amounts of battery power of a plurality of external electronic devices from the plurality of external electronic devices; and
when detecting that a remaining amount of battery power of the first external electronic device is less than a reference amount of battery power, based on the remaining amounts of battery power of the plurality of external electronic devices, determining an external electronic device for transmitting the audio data using the first communication channel, among the plurality of external electronic devices.

19. The method of claim 11, wherein receiving the configuration information comprises:
receiving the configuration information from the first external electronic device using the first communication channel; and
broadcasting the configuration information to the second external electronic devices using a broadcast band of the first communication channel,
wherein the configuration information comprises at least one of device address information, logical transport address information, clock information of the electronic device, clock offset between the electronic device and the first external device, or an encryption parameter for a link between the electronic device and the first external device.

20. An electronic device for outputting audio data, comprising:
an output device;
a communication circuit configured to support communications by a first communication scheme and a second communication scheme; and
a processor configured to:
establish a first communication channel corresponding to the first communication scheme with an external electronic device including the audio data;
establish a second communication channel corresponding to the second communication scheme with the external electronic device;
transmit, to the external electronic device, configuration information related to the first communication channel through the second communication channel; and
output, by the output device, the audio data using the audio data received from the external electronic device through the first communication channel,
wherein the configuration information comprises channel information for the first communication channel between the electronic device and the external electronic device.

* * * * *